(12) United States Patent
Jakobs et al.

(10) Patent No.: US 12,094,284 B2
(45) Date of Patent: Sep. 17, 2024

(54) ASSEMBLY AND METHOD FOR PROCESSING VALUE DOCUMENTS

(71) Applicant: GIESECKE+DEVRIENT CURRENCY TECHNOLOGY GMBH, Munich (DE)

(72) Inventors: Andreas Jakobs, Munich (DE); Wolfgang Koniger, Karlsfeld (DE); Michael Knickrehm, Augsburg (DE); Ralf Linck, Munich (DE); Helmut-Karl Reinisch, Munich (DE); Christian Voellmer, Pullach (DE); Carsten Nadolny, Munich (DE)

(73) Assignee: GIESECKE-DEVRIENT CURRENCY TECHNOLOGY GMBH, Munich (DE)

( * ) Notice: Subject to any disclaimer, the term of this patent is extended or adjusted under 35 U.S.C. 154(b) by 164 days.

(21) Appl. No.: 17/776,475

(22) PCT Filed: Nov. 11, 2020

(86) PCT No.: PCT/EP2020/025504
§ 371 (c)(1),
(2) Date: May 12, 2022

(87) PCT Pub. No.: WO2021/093990
PCT Pub. Date: May 20, 2021

(65) Prior Publication Data
US 2022/0392294 A1 Dec. 8, 2022

(30) Foreign Application Priority Data
Nov. 13, 2019 (DE) .......................... 102019007872.1

(51) Int. Cl.
*G07D 11/18* (2019.01)
*B65G 47/52* (2006.01)
(Continued)

(52) U.S. Cl.
CPC ............. *G07D 11/18* (2019.01); *B65G 47/52* (2013.01); *B65G 47/90* (2013.01); *G07D 7/181* (2017.05);
(Continued)

(58) Field of Classification Search
CPC ........ G07D 11/18; G07D 7/181; G07D 11/50; B65G 47/52; B65G 47/90
See application file for complete search history.

(56) References Cited

U.S. PATENT DOCUMENTS

| 3,608,698 A | 9/1971 | Crall |
| 5,794,534 A | 8/1998 | Enderlein et al. |

(Continued)

FOREIGN PATENT DOCUMENTS

| DE | 19514206 A1 | 10/1996 |
| DE | 19603363 A1 | 7/1997 |

(Continued)

OTHER PUBLICATIONS

Oncan et al., "Exact Solution Procedures for the Balanced Unidirectional Cyclic Layout Problem," European Journal of Operational Research, vol. 189, Mar. 21, 2008, pp. 609-623.
(Continued)

*Primary Examiner* — James R Bidwell
(74) *Attorney, Agent, or Firm* — Workman Nydegger

(57) ABSTRACT

An assembly and a method for processing value documents such that the assembly has a transport apparatus for value-document receptacles which forms a cyclically circulating transport loop for the value-document receptacles. At least one checking apparatus for checking value documents is connected to the transport apparatus in such a manner that a respective value-document stack, possibly together with its value-document receptacle, can be transported via the respective transport interface from the cyclically circulating (Continued)

transport loop to the respective checking apparatus and/or from the respective checking apparatus to the cyclically circulating transport loop. The cyclically circulating transport loop is self-contained in such a manner that the value-document receptacles can circulate around the cyclically circulating transport loop several times in the same direction of circulation, and thus allows a temporally flexible removal of the respective value-document stack.

20 Claims, 6 Drawing Sheets

(51) Int. Cl.
    *B65G 47/90*     (2006.01)
    *G07D 7/181*     (2016.01)
    *G07D 11/50*     (2019.01)

(52) U.S. Cl.
    CPC ......... *G07D 11/50* (2019.01); *G07D 2207/00* (2013.01); *G07D 2211/00* (2013.01)

(56) References Cited

U.S. PATENT DOCUMENTS

| | | |
|---|---|---|
| 7,487,909 B2 | 2/2009 | Eberhardt et al. |
| 9,457,970 B1 * | 10/2016 | Zevenbergen ......... B25J 9/0093 |
| 9,514,593 B2 | 12/2016 | Dopfer et al. |
| 2005/0269185 A1 * | 12/2005 | Roll ..................... B65G 47/52 198/367 |
| 2006/0212372 A1 | 9/2006 | Eberhard et al. |
| 2007/0264114 A1 | 11/2007 | Ma et al. |
| 2015/0179013 A1 | 6/2015 | Dopfer et al. |
| 2018/0318978 A1 | 11/2018 | Schneider et al. |

FOREIGN PATENT DOCUMENTS

| | | | |
|---|---|---|---|
| DE | 10329321 A1 | 1/2005 | |
| DE | 102012011231 A1 | 12/2013 | |
| DE | 102015015040 A1 | 5/2017 | |
| EP | 1268333 A1 | 1/2003 | |
| EP | 1992561 A2 | 11/2008 | |
| EP | 2757045 A1 | 7/2014 | |
| ES | 2285926 A1 * | 11/2007 | ........... G06Q 20/042 |
| FR | 2630412 A1 | 10/1989 | |
| WO | WO-2011036157 A1 * | 3/2011 | ............. B65G 47/90 |

OTHER PUBLICATIONS

International Search Report from PCT Application No. PCT/EP2020/025504, Feb. 18, 2021.

Search Report from German Application No. 102019007872.1, Jul. 30, 2020.

* cited by examiner

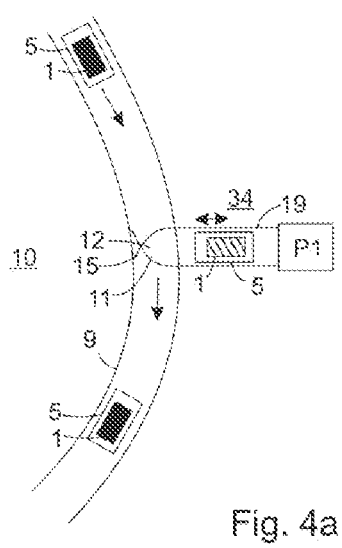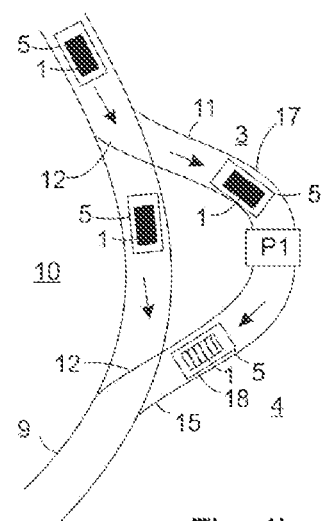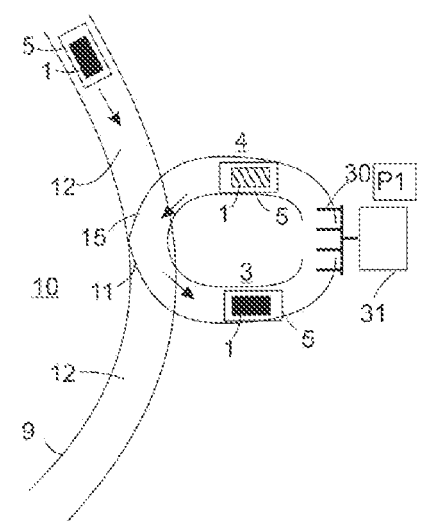
Fig. 4a  Fig. 4b  Fig. 4c
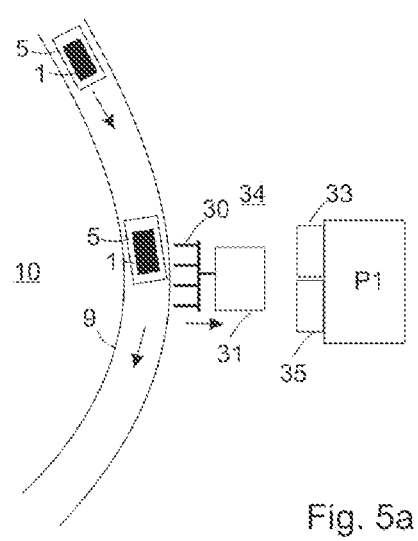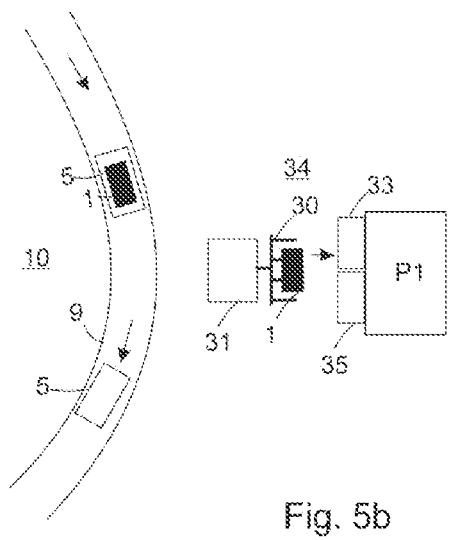
Fig. 5a  Fig. 5b
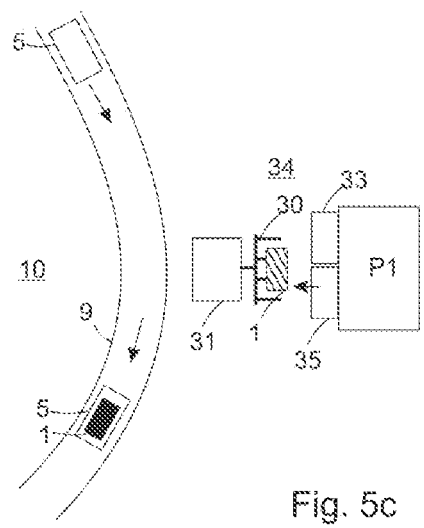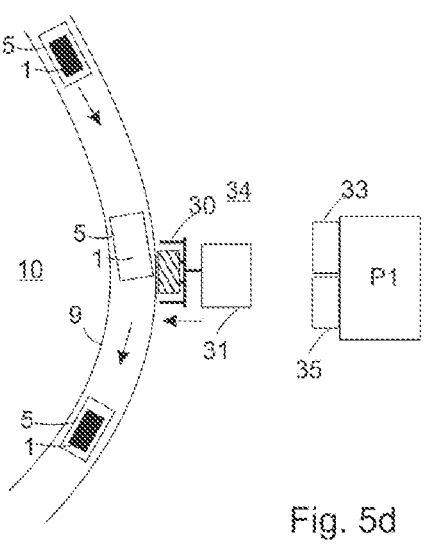
Fig. 5c  Fig. 5d

ASSEMBLY AND METHOD FOR PROCESSING VALUE DOCUMENTS

BACKGROUND

The invention relates to an assembly and a method for processing value documents, e.g. banknotes, checks, vouchers, tickets and the like.

In various countries, commercial enterprises are commissioned to take charge of and carry out certain tasks in the logistics of banknote circulation in so-called cash centers. Tasks that are performed by such cash centers consist, for example, in accounting for cash stocks delivered by customers and packaging and delivering the amounts of cash desired by the customer in the desired quantity. These cash stocks, which are assigned to a specific transaction (customer, cash machine, date, etc.), and which can often include coins in addition to banknotes, are usually also referred to as "deposits". The amount of cash assigned to a deposit is mostly kept and transported in a transport container, such as a bank note cassette or a security bag (safe bag). The deposits to be processed from one or several customers can be picked up and delivered to the cash center by security transport companies.

The processing of the banknotes in the cash center usually initially includes manual entry of the respective deposit. The stack of banknotes of the respective deposit is subsequently transported to a checking apparatus, which carries out an authenticity check and a condition check on each individual banknote and sorts the banknotes according to authenticity and condition. The banknotes are counted by the checking apparatus and the counting result is employed for the accounting of the deposit, wherein a credit is created for the deposit owner. The banknotes that have been processed in this manner are afterwards brought to a safe in the cash center. At a later point in time, the banknotes are removed from the safe for the purpose of customizing, i.e. are compiled for the desired delivery with regard to quantity and variety. For example, they are then wrapped in foil on a wrapping apparatus for delivery from the cash center. The transport tasks of the banknotes to be carried out in a cash center between preparation, checking and possibly customizing and packaging the banknotes has so far required a great amount of time and personnel.

SUMMARY

On these premises, it is the object of the present invention to make available an assembly and a method for processing value documents which can improve the transport tasks of the value documents, e.g. in a cash center.

The assembly for processing value documents has a transport apparatus for value-document receptacles, which is configured to transport several value-document receptacles, by which at least one value-document stack can be received in each case, along a direction of circulation. The transport apparatus according to the invention forms a cyclically circulating transport loop for the value-document receptacles. In addition, the assembly has at least one checking apparatus connected to the transport apparatus for checking value documents, in particular two or more checking apparatuses connected to the transport apparatus for checking value documents. The assembly has at least one transport interface for each of the checking apparatuses. The respective checking apparatus is connected to the transport apparatus by its transport interface in such a manner that a value-document stack located in the cyclically circulating transport loop, possibly together with a value-document receptacle receiving the respective at least one value-document stack, can be transported via the respective transport interface from the cyclically circulating transport loop to the respective checking apparatus and/or from the respective checking apparatus to the cyclically circulating transport loop. The transport interface of the respective checking apparatus is preferably arranged between the respective checking apparatus and the cyclically circulating transport loop. The value-document receptacle or the value-document stack can be transferred, for example by being pushed over by means of a pushing element from the checking apparatus to the cyclically circulating transport loop or vice versa from the cyclically circulating transport loop to the checking apparatus.

The direction of circulation of the cyclically circulating transport loop is that direction along the cyclically circulating transport loop along which the value-document receptacles are transported in the cyclically circulating transport loop (e.g. clockwise or counterclockwise). The transport apparatus can be configured to be operated selectively along either direction of circulation, so that the value-document receptacles can be transported selectively along a first direction of circulation or along a second direction of circulation reverse to the first. For example, the first transport direction forms a standard direction and, possibly, a temporary switch is made to the reverse, second direction of circulation.

The cyclically circulating transport loop is self-contained in such a manner that the value-document receptacles (in which one or several value-document stacks are possibly located) located in the cyclically circulating transport loop—without reversing their transport direction—can pass through the cyclically circulating transport loop several times in the same circulating direction. As long as the value-document receptacles remain on the transport apparatus, they pass through the cyclically circulating transport loop (without reversing their transport direction) automatically several times in the same direction of circulation. As long as the respective value-document stack is not removed at one of the transport interfaces (possibly together with its value-document receptacle), it passes through the cyclically circulating transport loop several times in succession with its value-document receptacle and thus passes the respective transport interface of the at least one checking apparatus several times. The cyclically circulating transport loop forms an endless transport loop for the value-document receptacles, in which one or several value-document stacks are possibly located. The cyclically circulating transport loop allows the value-document stack to be exchanged between the cyclically circulating transport loop and the respective checking apparatus or vice versa, as required, at a variable point in time. The cyclically circulating transport loop thus makes possible feeding the respective value-document stack to the respective checking apparatus with flexible timing.

In particular, the cyclically circulating transport loop can be a transport ring for value-document receptacles, in which value-document stacks are possibly located, in particular a self-contained transport ring. The shape of the cyclically circulating transport loop or transport ring is in no way restricted. For example, the transport loop or transport ring has several straight sections and several curves (e.g. 90° curves and/or 180° curves), and possibly also circular, ellipse-like, rectangle-like or differently shaped transport sections.

The cyclically circulating transport loop allows changing the processing sequence of the value-document stacks to be checked by the at least one checking apparatus (or by one or several further processing apparatuses connected to the cyclically circulating transport loop), e.g. if certain value-document stacks are to be processed with higher priority than other value-document stacks. Value-document stacks of lower priority can thus remain temporarily in the cyclically circulating transport loop and can only be fed to one of the checking apparatuses or further processing apparatuses during one of the next circulations around the cyclically circulating transport loop. While the value-document stacks of low priority circulate in the cyclically circulating transport loop, the value-document stacks to be processed with higher priority are fed from the cyclically circulating transport loop to the checking apparatuses or further processing apparatuses, even if they have been fed to the cyclically circulating transport loop later than the value-document stacks of low priority. The cyclically circulating transport loop thus makes it possible to deviate from the input sequence of the value-document stacks, in which they are fed to the cyclically circulating transport loop, when checking or further processing the value-document stacks.

The cyclically circulating transport loop forms a buffer storage for value-document stacks, which is connected to at least one checking apparatus. If two or more checking apparatuses or two or more further processing apparatuses are connected to the cyclically circulating transport loop, the cyclically circulating transport loop forms a buffer storage for value-document stacks, which can be employed for jointly feeding or removing value-document stacks to or from the checking apparatuses/further processing apparatuses. A buffer storage for each individual checking apparatus or for each individual further processing apparatus then can be dispensed with. The shared buffer storage allows e.g. feeding each value-document stack to any of the checking apparatuses/further processing apparatuses for its checking/further processing, i.e. possibly to one or another checking apparatus or to one or another further processing apparatus.

In particular, the transport apparatus has several transport devices lined up in a row, which form a ring closure. The beginning of the respectively consecutive one of the lined-up transport devices is arranged at the end of the respectively preceding one of the lined-up transport devices. The transfer of the value-document receptacles between the lined-up transport devices is preferably carried out automatically, e.g. by pushing, with the aid of the preceding transport device, the value-document receptacle over to the consecutive transport device, which then transports the value-document receptacle further.

The assembly preferably has at least two of the checking apparatuses connected to the transport apparatus, which are adapted for checking value documents, in particular for sorting the value documents transported or fed to the respective checking apparatus in the value-document stacks. For receiving the sorted value documents, these checking devices have e.g. at least two output compartments for checked and sorted value documents. In particular, the at least two checking apparatuses are each adapted to check the denomination and/or to check the authenticity and/or to check the condition of the respective value documents. The at least two checking apparatuses are preferably adapted in the same manner for checking or sorting the value documents, e.g. for checking or sorting the value documents according to the same checking classes or sorting classes. With regard to the sorting of the value documents, it is not important by which one of the checking apparatuses they were checked and sorted.

In addition, the assembly can have a control device that is adapted to cause value-document stacks transported in the transport apparatus to be fed possibly to one or the other of the at least two checking apparatuses, in particular in dependence on the utilization of one or both of the at least two checking apparatuses. The utilization of the checking apparatuses relates to e.g. the free processing capacity that the respective checking apparatus has for checking value documents currently at the respective point in time and/or anticipating the free processing capacity of the respective checking apparatus for checking value documents that is likely to exist in the imminent period of time.

First Variant Feed Loop

In a first variant of the assembly according to the invention, the transport interface assigned to the respective checking apparatus is a feed interface or a combined feed and discharge interface which is configured to feed a (e.g. unchecked) value-document stack, possibly together with a value-document receptacle receiving the at least one value-document stack, from the cyclically circulating transport loop to the respective checking apparatus. The cyclically circulating transport loop can e.g. form a cyclically circulating feed loop for value-document stacks to the checking apparatuses, from which value-document stacks, possibly together with the value-document receptacle receiving the respective at least one value-document stack, can be fed to the respective checking apparatus. In particular, the cyclically circulating transport loop on which the feed interface is located can form a combined cyclically circulating feed and discharge loop.

Before being processed with a checking apparatus, the value documents are usually prepared at one or several preparation stations for the upcoming machine check. Along the cyclically circulating transport loop (feed loop) e.g. one or several transport interfaces to preparation stations are present by which the preparation stations are connected to the cyclically circulating transport loop. The transport interface of the respective preparation station is adapted to feed value-document stacks prepared at the preparation station (e.g. unchecked value-document stacks) that are to be checked by a checking apparatus, possibly together with a value-document receptacle receiving the respective at least one value-document stack, to the cyclically circulating transport loop. Each preparation station can have its own transport interface. Alternatively, however, two or more preparation stations can also be connected to the cyclically circulating transport loop via the same transport interface.

In some embodiment examples, the respective transport interface of the respective preparation station is adapted to insert a value-document stack into one of the value-document receptacles that is located in the cyclically circulating transport loop. For example, the transport interface of the preparation station has a gripper for this purpose, which inserts the respective value-document stack into the value-document receptacle at a point in time while this value-document receptacle is transported in the cyclically circulating transport loop. Alternatively, the transport interface of the preparation station can also be configured to feed value-document stacks together with their value-document receptacle to the cyclically circulating transport loop. The (loaded) value-document receptacles can be fed to the cyclically circulating transport loop by a gripper or by an inlet. As an alternative to this, the feeding of the value-document receptacles loaded with a value-document stack or the feeding of the value-document stack alone (without value-document receptacle) to the cyclically circulating transport loop can also be carried out manually.

For delivering the value-document receptacles loaded with value-document stacks or value-document stacks alone (without value-document receptacle) from the preparation station to the cyclically circulating transport loop, it is also possible to employ a self-propelled transport vehicle, which vehicle can itself form the transport interface to the cyclically circulating transport loop (and e.g. itself has the above-mentioned gripper for this purpose). Alternatively, the self-propelled transport vehicle can transfer the value-document stacks or value-document receptacles also to a transport interface of the preparation station.

The transport interfaces of the preparation stations and the further processing apparatus to the cyclically circulating transport loop can be constructed analogously to the transport interfaces of the checking apparatus, e.g. have a gripper or a branching and/or inlet, which e.g. is connected to a transport switch contained in the cyclically circulating transport loop.

If two or more checking apparatuses are connected to the cyclically circulating transport loop, the value-document stacks prepared at the preparation station can be divided between two or more than two checking apparatuses with the aid of the cyclically circulating transport loop (feed loop). This allows simultaneous processing of several deposits at different checking apparatuses and/or dividing the same deposit between different checking apparatuses. It is achieved through the cyclically circulating transport loop that, selectively, each of the value-document receptacles with its at least one value-document stack can be fed to any checking apparatus, e.g. in dependence on which checking apparatus currently has free processing capacities (which is not currently busy checking value documents). A possible backlog of value-document stacks at a specific checking apparatus is thereby avoided.

The cyclically circulating transport loop forms a buffer storage for value-document stacks, which allows the respective checking apparatus to remove a value-document stack, possibly together with the value-document receptacle receiving the respective at least one value-document stack, from the cyclically circulating transport loop at a variable removal time. The value-document receptacles can possibly pass the at least one checking device several times in the same direction of circulation. Thus, for each individual value-document receptacle, there are several possible points in time at which the respective value-document receptacle can be removed from the cyclically circulating transport loop via the transport interface in order to reach a checking apparatus. For example, the respective value-document stack can be fed to the respective checking apparatus during the first circulation or only during a later circulation in the cyclically circulating transport loop.

Second Variant Discharge Loop

In a second variant of the assembly according to the invention, the transport interface assigned to the respective checking apparatus is a discharge interface or a combined feed and discharge interface that is configured to discharge a (checked) value-document stack, possibly together with the respective value-document receptacle receiving at least one value-document stack, from the respective checking apparatus to the cyclically circulating transport loop. After the value-document stack has been removed from the respective value-document receptacle (by the transport interface or by the checking apparatus), the emptied value-document receptacle can be transported back to the cyclically circulating transport loop via the respective discharge interface from the respective checking apparatus. Alternatively, value-document receptacles loaded with value-document stacks can also be transported from the respective checking apparatus via the discharge interface to the cyclically circulating transport loop. At least one feed interface to at least one further checking apparatus can also be present along the cyclically circulating discharge loop.

The cyclically circulating transport loop forms e.g. a cyclically circulating discharge loop for value-document stacks, into which the value-document stacks, possibly together with the value-document receptacle receiving the respective at least one value-document stack, can be discharged from the respective checking apparatus. In particular, the cyclically circulating transport loop on which the discharge interface is located can form a combined cyclically circulating feed and discharge loop.

Along the cyclically circulating transport loop (discharge loop) there is at least one transport interface to a further processing apparatus, preferably at least two transport interfaces to at least two further processing apparatuses, via which the respective further processing apparatus is connected to the cyclically circulating transport loop. The transport interface of the respective further processing apparatus is adapted to discharge value-document stacks checked by one of the checking apparatuses, possibly together with a value-document receptacle receiving the respective at least one value-document stack, from the cyclically circulating transport loop so that the value-document stacks can be transported to the respective further processing apparatus.

The value-document stacks further processed by the further processing apparatus can be discharged to another transport apparatus or transported back from the respective further processing apparatus to the same cyclically circulating transport loop by which they were transported to the further processing apparatus. The value-document stacks that have been processed further can be received in a value-document receptacle when they are discharged or transported back, or can be transported without a value-document receptacle.

The further processing apparatus can be configured e.g. for banding and/or for packaging value-document stacks. In this case, a single or also several value-document stacks can be banded into a jointly banded packet or packed together in the same packaging. Alternatively, the further processing apparatus can be configured for destroying, e.g. shredding, value documents unfit for circulation. The further processing apparatus can also be configured for customizing value documents, wherein specific quantities of one or several types of value documents are compiled (e.g. for delivery from a cash center). Along the cyclically circulating transport loop (discharge loop), transport interfaces can be present to several similar and/or to several different ones of the further processing apparatuses mentioned.

The value-document stacks checked on the respective checking apparatus are divided, for example, between at least two further processing apparatuses with the aid of the cyclically circulating transport loop (discharge loop). This allows simultaneous processing of the checked value-document stacks on different further processing apparatuses. It is achieved through the cyclically circulating transport loop that each of the value-document receptacles with their checked value-document stack can be fed to any further processing apparatus, e.g. in dependence on which further processing apparatuses currently have free processing capacity (which one is currently not busy with the further processing of value documents). A possible backlog of value document stacks at a specific further processing apparatus is avoided thereby.

Special Assemblies

The preparation stations and/or checking apparatuses and/or further processing apparatuses can be arranged immediately adjacent to their respective transport interface, via which they are connected to the cyclically circulating transport loop. However, they can also be arranged remotely from their respective transport interface and be connected therewith via a corresponding transport device that transports the value-document stacks, possibly together with the value-document receptacle receiving the respective at least one value-document stack, to the transport interface of the respective preparation stations or checking apparatus or further processing apparatus.

In particular, the at least one checking apparatus and preparation station are arranged along the cyclically circulating transport loop in such a manner that—viewed in the direction of circulation of the value-document receptacles along the cyclically circulating transport loop—after at least one transport interface of a preparation station, there follows the transport interface of a checking apparatus as the next transport interface.

In particular, the checking apparatuses and further processing apparatuses are arranged along the cyclically circulating transport loop in such a manner that—viewed in the direction of circulation of the value-document receptacles along the cyclically circulating transport loop—after at least one transport interface of a checking apparatus, there follows the transport interface of a further processing apparatus as the next transport interface. The checking apparatuses and/or preparation stations and/or further processing apparatuses are preferably all arranged outside the cyclically circulating transport loop. This has the advantage that these are then easily accessible, e.g. with respect to manual intervention or maintenance of the respective apparatus. Alternatively, however, it can also be advantageous for one or several checking apparatuses to be arranged within the cyclically circulating transport loop, since this makes possible a more compact assembly.

Alternative Route

In some embodiment examples, the cyclically circulating transport loop has at least one first transport interface, in particular a branching, to an alternative route for the value-document receptacles (in which a value-document stack is possibly received). The alternative route branches off from the cyclically circulating transport loop and rejoins at another point along the cyclically circulating transport loop. Viewed along the direction of circulation of the cyclically circulating transport loop after the first transport interface, the cyclically circulating transport loop has a second transport interface, in particular an inlet, for the value-document receptacles from the alternative route. Instead of a branching and an inlet, the first and/or the second transport interface to the alternative route can also be formed by a gripper which reloads the value-document stacks, possibly together with the value-document receptacle receiving the value-document stack, between the cyclically circulating transport loop and the alternative route. The alternative route can be located on a cyclically circulating feed loop, on a cyclically circulating discharge loop or on a combined feed and discharge loop. The alternative route bypasses part of the cyclically circulating transport loop, i.e. it makes it possible for the value-document receptacles to be able to bypass part of the cyclically circulating transport loop if required. In the section of the cyclically circulating transport loop bypassed by the alternative route, there is usually located one or several transport interfaces, e.g. to checking or further processing apparatuses, which can practically be skipped by the value-document receptacles through transporting them along the alternative route.

The alternative route can be longer or shorter than the section of the cyclically circulating transport loop bypassed by the alternative route. Preferably, however, the alternative route is a shortcut route that is shorter than the route leading along the cyclically circulating transport loop between the first and second transport interface, in particular between the branching and the inlet of the shortcut route. The shortcut route is an alternative route for the value-document receptacles that bypasses and shortens part of the cyclically circulating transport loop. The shortcut route creates an additional possibility of changing the processing sequence of the value-document stacks in that value-document stacks with higher priority are fed to the checking apparatus or further processing apparatus faster and can be processed earlier than value-document stacks with lower priority, which are transported along the entire cyclically circulating transport loop.

Offload Branch

In some embodiment examples, the cyclically circulating transport loop has at least one transport interface, in particular a branching and an inlet, to an offload branch, in which value-document receptacles can be temporarily separated from the cyclically circulating transport loop (possibly parked or transported slowly) and from which these can be re-introduced into the cyclically circulating transport loop at a later point in time. The offload branch can be on a cyclically circulating feed loop, on a cyclically circulating discharge loop or on a combined feed and discharge loop.

The offload branch is an additional possibility to change the processing sequence of the value-document stacks in that value-document stacks of lower priority are temporarily stored in the offload branch and are only transported out of the offload branch later, in order to then be fed to a checking apparatus or to a further processing apparatus. The offload branch can have a section with bidirectional transport of the value-document receptacles, i.e. with reversing the transport direction of the value-document receptacles between the separation and introduction.

Alternatively, the offload branch can also branch off from the cyclically circulating transport loop and rejoin at another point along the cyclically circulating transport loop and be unidirectional (i.e. the value-document receptacles do not reverse their transport direction between being separated and introduced). The offload branch bypasses part of the cyclically circulating transport loop, but the transport route between the branching and the inlet along the offload branch is usually longer than the route along the cyclically circulating transport loop. There is usually no transport interface in the section of the cyclically circulating transport loop bypassed by the offload branch.

Further Embodiment Examples

The cyclically circulating transport loop of the assembly can form a cyclically circulating feed loop for value-document stacks to the respective checking apparatus and another cyclically circulating transport loop of the assembly can form a cyclically circulating discharge loop for value-document stacks from the respective checking apparatus. For example, for one or several checking apparatuses, the assembly has both a feed interface via which (e.g. unchecked) value-document stacks, possibly together with a value-document receptacle receiving the respective at least one value-document stack, can be fed by a cyclically circulating transport loop to the respective checking apparatus. The respective checking apparatus also has a discharge interface that is different from the feed interface, via which value-document stacks checked by the respective checking apparatus, possibly together with a value-document receptacle receiving the respective at least one value-document stack, can be discharged from the respective checking apparatus to another cyclically circulating transport loop (i.e. a cyclically circulating transport loop that is different from the one by which these value-document stacks were fed to the respective checking apparatus via the feed interface or via the combined feed and discharge interface). The feed interface and discharge interface can also be formed by a combined feed and discharge interface. The cyclically circulating feed loop can be connected to at least one preparation station and the cyclically circulating discharge loop to at least one further processing apparatus.

The assembly can have one or several of the checking apparatuses as well as the cyclically circulating transport loop (adapted as a cyclically circulating feed loop) and the other cyclically circulating transport loop (adapted as a cyclically circulating discharge loop), wherein the two cyclically circulating transport loops are separate from one another. One feed interface each of the cyclically circulating transport loop or feed loop and a discharge interface of the other cyclically circulating transport loop or discharge loop are located on the same checking apparatus or are connected to the same checking device. In this manner, the value documents can be transported from the cyclically circulating transport loop (feed loop) by passing the checking apparatus in which the value documents are checked, directly into the other cyclically circulating transport loop (discharge loop). At least one checking apparatus is connected—with reference to the transport route of the value documents—between the cyclically circulating transport loop (feed loop) and the other cyclically circulating transport loop (discharge loop) in such a manner that value documents can be transported from the cyclically circulating transport loop (feed loop) through the feed interface to the respective checking apparatus and (the same value documents, after their check) can be transported from this checking apparatus via the discharge interface to the other cyclically circulating transport loop (discharge loop). In order to keep the transport routes short, the respective checking apparatus connected between the two cyclically circulating transport loops is preferably arranged between the two cyclically circulating transport loops (feed loop and discharge loop).

Along the cyclically circulating transport loop there can be one or several feed interfaces to one or several checking apparatuses and one or several discharge interfaces from one or several checking apparatuses. The cyclically circulating transport loop can form both a cyclically circulating feed loop for value-document stacks to the respective checking apparatus and a cyclically circulating discharge loop for value-document stacks from the respective checking apparatus, i.e. a combined cyclically circulating feed and discharge loop. For one or several checking apparatuses, the assembly has e.g. a feed interface via which (e.g. unchecked) value-document stacks, possibly together with the respective value-document receptacle receiving at least one value-document stack, can be fed from the cyclically circulating transport loop to the respective checking apparatus, as well as a discharge interface, via which the value-document stacks checked by the respective checking apparatus, possibly together with a value-document receptacle receiving the respective at least one value-document stack, can be transported back to the same cyclically circulating transport loop from which they were fed to the respective checking apparatus via the feed interface.

The feed interface and/or discharge interface of the respective checking apparatus can be formed by a combined feed and discharge interface, which is adapted to transport the value-document stack, possibly together with a value-document receptacle receiving the respective at least one value-document stack, both from the cyclically circulating transport loop to the respective checking apparatus and from the respective checking apparatus to the cyclically circulating transport loop. In the case of one or several checking apparatuses, the combined feed and discharge interface of the checking apparatus has e.g. a bidirectional transport section, which is connected both to a branching from the cyclically circulating transport loop and to an inlet to the cyclically circulating transport loop, and via which one or several value-document receptacles, each of which being loaded with at least one value-document stack, can be transported both from the cyclically circulating transport loop to the respective checking apparatus and from the respective checking apparatus to the cyclically circulating transport loop.

For example, the feed interface of the checking apparatus or the combined feed and discharge interface of the checking apparatus can be adapted to transfer the value-document stack alone, i.e. without the value-document receptacle with which it is transported on the cyclically circulating transport loop, from the cyclically circulating transport loop to the checking apparatus and/or vice versa. Alternatively, it can be adapted to
- take over a value-document stack received by a value-document receptacle together with the value-document receptacle from the cyclically circulating transport loop, and
- detach the value-document stack from the value-document receptacle (e.g. automatically open a clamping device and/or remove it from a value-document container with a gripper) and feed it to the checking apparatus, and
- return the value-document receptacle in which the value-document stack was received to the cyclically circulating transport loop.

For example, the respective transport interface of the respective checking apparatus is adapted to remove a value-document stack from one of the value-document receptacles that are located in the cyclically circulating transport loop and to transport it to the respective checking apparatus and/or to insert a value-document stack that the respective transport interface removes from the checking apparatus, from the respective checking apparatus into one of the value-document receptacles that are located in the cyclically circulating transport loop.

Gripper

In some embodiment examples, the transport interface has a gripper for one or several checking apparatuses, via which the respective checking apparatus is connected to the cyclically circulating transport loop. The gripper is adapted, when the respective value-document receptacle is within range of the gripper, to remove a value-document stack, possibly together with a value-document receptacle receiving the respective at least one value-document stack, from the cyclically circulating transport loop and to feed the respective value-document stack to the respective checking apparatus and/or to take over a respective value-document stack, possibly together with a value-document receptacle receiving the respective at least one value-document stack, from the respective checking apparatuses and to feed it to the cyclically circulating transport loop.

In particular, the gripper is adapted to transfer the respective value-document stack without its value-document receptacle from the cyclically circulating transport loop to the checking apparatus and/or from the checking apparatus to the cyclically circulating transport loop. For example, the gripper can remove a value-document stack from one of the value-document receptacles located in the cyclically circulating transport loop and/or insert it into a value-document receptacle located in the cyclically circulating transport loop. The removal or insertion of the respective value-document stack from/into the respective value-document receptacle can be carried out while the respective value-document receptacle is transported by the transport apparatus of the cyclically circulating transport loop.

Alternatively, for removal or insertion (of the value-document stack or the value-document receptacle receiving the value-document stack) by means of a gripper, the transport apparatus of the cyclically circulating transport loop can be stopped and the value-document stack or the value-document receptacle receiving the value-document stack can be removed or inserted while the transport apparatus is stopped. Alternatively, only the transport of a specific value-document receptacle along the cyclically circulating transport loop can be temporarily stopped or braked sharply for removal by means of a gripper (while the other value-document receptacles of the cyclically circulating transport loop are transported further), and the value-document stack can be removed from the stopped value-document receptacle.

Alternatively, the respective value-document stack is only removed with the gripper from the value-document receptacle or inserted into it after the respective value-document receptacle has been taken off the transport apparatus of the cyclically circulating transport loop, e.g. lifted off or separated. Taking the respective-value document receptacle off from the transport apparatus of the cyclically circulating transport loop takes place e.g. with the aid of the same gripper as the removal or insertion of the value-document stack from/into this value-document receptacle.

The gripper can be permanently installed at the transport interface. Alternatively, the gripper can be installed on a self-propelled transport vehicle that is located (e.g. temporarily) at the transport apparatus of the cyclically circulating transport loop. In particular, the checking apparatus is arranged close to the transport interface in such a manner that an input interface of the checking apparatus, in particular an input compartment of the checking apparatus, is within the reach of the gripper and/or the checking apparatus is arranged close to the transport interface in such a manner that an output interface of the checking apparatus, in particular an output compartment of the checking apparatus, is located within the range of the gripper.

Continuous Separation and/or Introduction

In particular, in the case of one or several checking apparatuses, the feed interface or the combined feed and discharge interface of the checking apparatus can have a branching, which is connected to the transport apparatus of the cyclically circulating transport loop in such a manner that, via the transport switch, one or several value-document receptacles can selectively be either continuously transported from the cyclically circulating transport loop into the respective branching or (bypassing the branching) be continuously transported further in the cyclically circulating transport loop (in order to possibly continue circulating or to be transported to a further checking apparatus). A transport switch can be employed to connect the cyclically circulating transport loop to the feed interface or the combined feed and discharge interface. The respective value-document receptacle, which is branched off via the branching from the cyclically circulating transport loop, e.g. is transported to an input interface of a checking apparatus. The removal of the respective value-document stack from the branched-off value-document receptacle takes place when the respective value-document receptacle is located at the input interface of the checking apparatus, e.g. by a removal device of the input interface (e.g. rake or gripper). The removed value-document stack is subsequently checked by the checking apparatus.

In particular, in the case of one or several checking apparatuses, the discharge interface or the combined feed and discharge interface of the checking apparatus can have an inlet which is connected to the transport apparatus of the cyclically circulating transport loop in such a manner that one or several value-document receptacles, each with at least one value-document stack received therein, can be transported continuously by the checking apparatus via the inlet into the cyclically circulating transport loop. The inlet is adapted to transport and transfer one or several value-document receptacles, each with at least one value-document stack located therein, which was output from the respective checking apparatus, to the cyclically circulating transport loop (discharge loop). A transport switch can be employed to connect the discharge interface or the combined feed and discharge interface to the cyclically circulating transport loop. However, the transfer of the value-document receptacle or the value-document stack to the cyclically circulating transport loop can also be implemented by pushing over. The value-document stack checked respectively by one of the checking apparatuses is inserted in a value-document receptacle which is located at the output interface of the respective checking apparatus for this purpose. The insertion of the checked value-document stack into the value-document receptacle takes place in particular while the respective value-document receptacle is located at an output interface of the checking apparatus. The insertion of the value documents can take place e.g. by an insertion device located at the output interface (e.g. rake or gripper). The respective value-document receptacle, in which a value-document stack checked by the checking apparatus was inserted, is then transported from the output interface of the checking apparatus via the inlet into the cyclically circulating transport loop.

The discharge interface and the feed interface for the respective checking apparatus can be connected to one another in such a manner that the discharge interface and the feed interface form a further cyclically circulating transport loop for the value-document receptacles.

Opposite Parallel Transport Sections

In some embodiment examples, the cyclically circulating transport loop has at least two transport sections directed in opposite directions to one another, in which the value-document receptacles are transported in opposing directions and which extend parallel to one another. For example, the two parallel, oppositely directed transport sections of the cyclically circulating transport loop are arranged one below the other or immediately next to each other, preferably with a lateral distance (distance in the plane of the cyclically circulating transport loop) of less than 2 m from each other. Along at least one of the two parallel, oppositely directed transport sections there is at least one first transport interface present, which is in particular a transport interface for one of the checking apparatuses and/or a transport interface for a further processing apparatus and/or a transport interface for a preparation station. The first transport interface is configured to transport a value-document stack, possibly together with a value-document receptacle receiving the respective at least one value-document stack, via the respective first transport interface from the cyclically circulating transport loop to the respective checking apparatus or further processing apparatus and/or from the respective checking apparatus or further processing apparatus or preparation station to the cyclically circulating transport loop. The first transport interface is e.g. a combined feed and discharge interface.

For that checking apparatus or further processing apparatus or preparation station which has the first transport interface to one of the two parallel, oppositely directed transport sections, the first transport interface can at the same time also form a transport interface to the other one of the two parallel, oppositely directed transport sections. For example, the first transport interface can have a gripper that can access both parallel, oppositely directed transport sections in order to remove value-document stacks, possibly together with a value-document receptacle receiving the respective at least one value-document stack, from the respective transport section. Alternatively, this checking apparatus or further processing apparatus or preparation station can also have a second transport interface to the other one of the two parallel, oppositely directed transport sections. The second transport interface is configured to transport a value-document stack, possibly together with a value-document receptacle receiving the respective at least one value-document stack, via the second transport interface from the relevant transport section of the cyclically circulating transport loop to the respective checking apparatus or further processing apparatus and/or from the respective checking apparatus or further processing apparatus or preparation station to the second transport port section of the cyclically circulating transport loop.

Bypass Transport Route

In some embodiment examples, the transport apparatus along the cyclically circulating transport loop has at least one transport interface to a bypass transport route for the value-document receptacles, which leads from the cyclically circulating transport loop to one of the further processing apparatuses mentioned above and/or to a further transport apparatus (e.g. to another cyclically circulating transport loop) which can be connected to at least one of the above-mentioned further processing apparatuses. Value-document receptacles (in which one or no value-document stack can be received) via the bypass transport route can be transported from the cyclically circulating transport loop to the further processing apparatus and/or to the other cyclically circulating transport loop or vice versa can be transported from the further processing apparatus and/or from the other cyclically circulating transport loop to the cyclically circulating transport loop. The transport interface to the bypass transport route can have a branching and/or an inlet or a gripper that reloads value-document stacks, possibly together with the value-document receptacle receiving the at least one value-document stack, between the cyclically circulating transport loop and the bypass transport route. The bypass transport route bypasses the transport of the value-document receptacles to a checking apparatus and thus makes it possible for value-document receptacles to be discharged from or fed to the cyclically circulating transport loop more quickly.

For example, via a bypass transport route, value-document stacks (e.g. unchecked) can be taken to a further processing apparatus or to the other cyclically circulating transport loop bypassing the checking apparatuses. Via another bypass transport route, emptied value-document receptacles whose value-document stack e.g. was removed at a further processing apparatus, can be taken from the further processing apparatus or from the other cyclically circulating transport loop back to the cyclically circulating transport loop (mentioned first above) from which the value-document stacks were previously fed to one of the checking apparatuses. In one embodiment example, the cyclically circulating transport loop has a first transport interface to a first bypass transport route, via which value-document receptacles (in which a value-document stack is possibly received) are transported from the cyclically circulating transport loop to another cyclically circulating transport loop, and has a second transport interface to a second bypass transport route, via which value-document receptacles (in which a value-document stack is possibly received) can be transported back from the other cyclically circulating transport loop to the cyclically circulating transport loop.

Value-Document Receptacles

Various embodiments are conceivable for the value-document receptacles of the value-document stacks. The value-document receptacle is preferably configured to receive a value-document stack in such a manner that—even when the value-document receptacles are being transported by the transport apparatus—the value-document stack remains in the shape of a stack, i.e. that the stack shape is retained. The value-document receptacles can be permanently installed on the transport apparatus or can be demountable from the transport apparatus. The value-document receptacles have e.g. an individual identifier, e.g. a bar code, a QR code or an RFID element to make possible secure tracking of the value-document receptacles and value-document stacks.

For example, the respective value-document receptacle can have a value-document container that is configured to receive a value-document stack in its interior, wherein possibly the side walls and the base of the container secure the stack shape. The value-document container can be configured to receive exactly one value-document stack. Alternatively, the value-document container can also be configured to receive several value-document stacks, which are received in sections of the value-document container that are detached from one another. The value document can stand with its edges on the base of the value-document container or rest with its surfaces on the base. Alternatively or additionally, the respective value-document receptacle can have a clamping apparatus for value-document stacks, which is configured to hold a value-document stack by means of a clamping force, so that the stack shape is retained. For example, the clamping device has a releasable clamp for value-document stacks, which can clamp a value-document stack against a spring force.

Transport Apparatus

Various embodiments are also conceivable for the transport apparatus of the cyclically circulating transport loop. For example, the transport apparatus has at least one conveyor belt, on which value-document receptacles can be transported along the cyclically circulating transport loop, in particular several conveyor belts lined up. Alternatively or additionally, the transport apparatus can have one or several lined up roller conveyors on which value-document receptacles can be transported along the cyclically circulating transport loop.

Method

The invention also relates to a method for processing value documents with the aid of two or more checking apparatuses that are configured to check value documents, and with the aid of a transport apparatus that transports several value-document receptacles in which there is received respectively at least one value-document stack. The checking apparatuses are connected to the transport apparatus via respectively at least one transport interface, via which one or several value-document stacks, possibly together with a value-document receptacle receiving the respective at least one value-document stack, are transported from the transport apparatus to the respective checking apparatus and/or from the respective checking apparatus to the transport apparatus.

The transport apparatus forms a cyclically circulating transport loop for the value-document receptacles, wherein the respective checking apparatus is connected to the cyclically circulating transport loop by the respective transport interface. The respective value-document stack, possibly together with a value-document receptacle receiving the respective at least one value-document stack, is transported via the respective transport interface from the cyclically circulating transport loop (immediately) to the respective checking apparatus and/or from the respective checking apparatus (immediately) to the cyclically circulating transport loop. The features mentioned above apply not only to the assembly according to the invention, but also to the method according to the invention.

BRIEF DESCRIPTION OF THE DRAWINGS

The invention will be explained and described in more detail hereinafter with reference to the enclosed figures. There are shown:

FIG. 4a-c embodiment examples of a checking apparatus with a combined feed and discharge interface (FIG. 4a); with mutually separate feed and discharge interfaces (FIGS. 4b, c);

FIG. 5a-d embodiment example of a combined feed and discharge interface with a gripper;

DETAILED DESCRIPTION OF VARIOUS EMBODIMENTS

The assembly according to the invention can be used wherever one or several checking apparatuses are employed to check value documents. The invention relates to the processing of stackable value documents such as banknotes, checks, vouchers, tickets, and the like. It is explained below using banknotes as an example, but is also suitable for other value documents whose machine processing is to be carried out by one or several checking apparatuses.

Figure 1A:
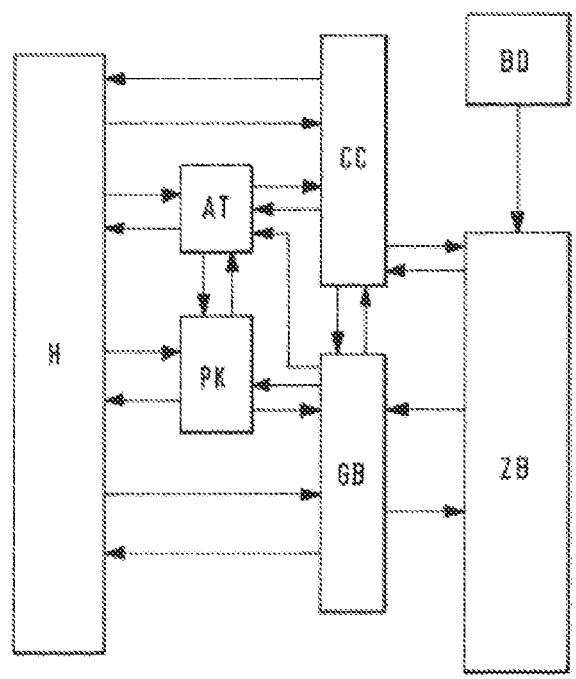
FIG. 1a a schematic representation of a money cycle.

FIG. 1a shows, in a schematic representation, a money cycle customary for banknotes. In a bank note printing plant BD the bank notes are produced by order of a central bank ZB. Via the central bank ZB the finished bank notes are put into circulation by being issued to individual commercial banks GB or to cash centers CC. Merchants H (commercial enterprises) receive their stocks of cash through private customers, i.e. buyers PK, or from the commercial banks GB. For accounting and checking of the deposited cash, the merchants H pass their cash on to the cash centers CC or commercial banks GB. The buyers PK also receive their cash through the commercial banks GB. Moreover, cash that was already in circulation can flow back from the commercial banks GB and cash centers CC to the central bank ZB, to be possibly rechecked for authenticity and/or fitness for circulation there and for the destruction of bank notes no longer fit for circulation. An essential task of a cash center is the processing of cash, in particular of banknotes, which are delivered to the cash centers CC by their business customers. These can be e.g. cash takings which are delivered to the cash centers CC directly by the merchants H or by commercial banks GB or from associated automatic teller machines AT.

The data of a delivered deposit are entered into the associated cash center management software on a computer that is connected to computers at various locations in the cash center via signal lines. This data transmission takes place separately from the handling of the transport container or the value-document stacks in the cash center. Alternatively, the data can be stored in a chip of the respective transport container and practically carried along therewith. In order to make possible an allocation of the data records in the software to the respective deposit, the individual identifier of the respective transport container can be recorded, e.g. by scanning the bar code of the transport container. It can also be provided to allocate to and enclose with the individual deposits an information card that identifies the respective deposit.

The assembly according to the invention can be used in particular in a cash center in which the banknotes are processed by various apparatuses. The value documents delivered to the cash center by a security transport company are first divided into banknotes and coins, which are usually processed by machine separately from one another. The banknotes of the respective deposit are subsequently brought into a stack shape at a preparation station. Possibly, the respective deposit is also recorded by machine for the first time at the preparation station. At the preparation station, the prepared banknote stack of the respective deposit is brought into a value-document receptacle, in particular (separately from the value-document stacks of other deposits) inserted in a transport container. The banknote stacks contained in the transport containers are subsequently transported to the checking apparatuses, where they are then checked. The checking of the banknotes by the checking apparatuses can, for example, include an authenticity check and optionally a check of the condition of the banknotes, as well as counting and sorting of the banknotes.

Figure 1B:
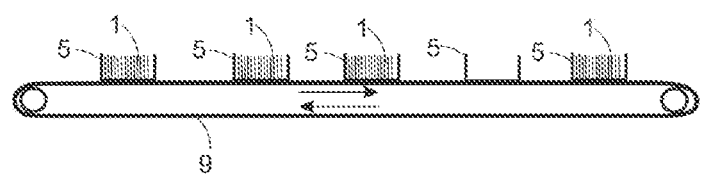
FIGS. 1b, c embodiment examples of the transport apparatuses and the value-document receptacles in a side view.
Figure 1C:
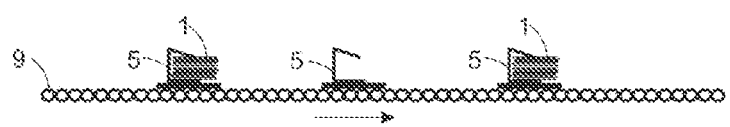
FIG. 1d an embodiment example of a feed interface and a discharge interface to/from a checking apparatus in a side view.
Figure 2A:
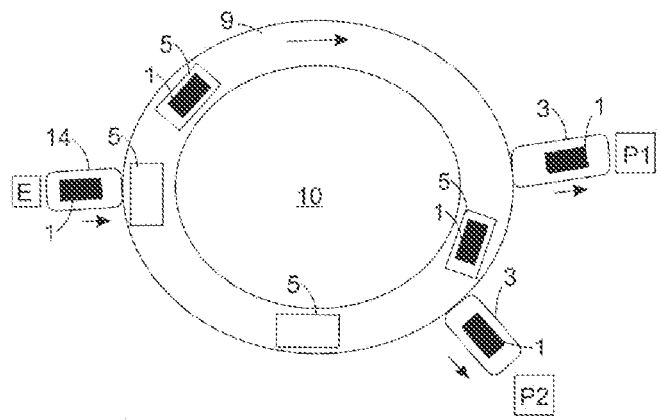
FIG. 2a, b in plan view a cyclically circulating transport loop for feeding value-document stacks to two checking apparatuses (FIG. 2a) and a cyclically circulating transport loop for discharging value-document stacks from two checking apparatuses (FIG. 2b)

In FIGS. 1b and 1c possible realizations of a transport apparatus 9 are outlined, by which value-document receptacles 5, in which respectively at least one value-document stack 1 is located, can be transported along a cyclically circulating transport loop 10, cf. FIG. 2a, b. The transport apparatus 9 can have e.g. one or several transport belts, in particular conveyor belts, on which value-document receptacles 5 are transported by the movement of the conveyor belt, as outlined in FIG. 1b. However, the transport apparatus 9 can also have at least one roller conveyor, as outlined in FIG. 1c. The roller conveyor forms a roller guide on which value-document receptacles 5 are transported by the movement of the rollers. The rollers are cylindrical, with their axis perpendicular to the transport direction of the value-document receptacles. The roller conveyor or conveyors are possibly equipped with side walls for lateral guidance of the value-document receptacles 5.

Instead of a value-document container 5, as shown in FIG. 1b, other value-document receptacles 5 that are not container-shaped can also be employed. The value-document receptacles can include e.g. clamping apparatuses, as outlined in FIG. 1c, which hold the respective value-document stack 1 in a stack shape by means of spring force. For example, only the clamping device is opened at the respective transport interface in order to remove the value-document stack from the transport apparatus. Alternatively, the clamping device with the value-document stack clamped therewith is removed from the transport apparatus at the respective transport interface, while a support of the clamping device remains on the transport apparatus. Alternatively, in order to remove the value-document stack, the clamping device can also be removed from the transport apparatus together with the support and the two can remain together. Possibly, the support of the clamping device can also be returned onto the transport apparatus.

Alternatively, the value-document receptacles can also have repositories for value documents, on which the value documents rest with their surfaces and which e.g. have a horizontal or inclined resting surface. The respective resting surface of the value-document receptacle can be provided with lateral webs next to the respective value-document stack, which webs secure the respective value-document stack against slipping in order to maintain the stack shape. Alternatively, the value-document receptacles can also be formed by the sections of a conveyor belt, which are distributed over the conveyor belt along the direction of circulation of the transport apparatus, wherein one section of the conveyor belt forms a repository for one value-document stack in each case. These conveyor belt sections can be provided with one or several webs that prevent the value-document stack 1 from slipping and thus secure its stack shape. The conveyor belt sections that form the value-document receptacles can each have an individual identifier.

Figure 1D:
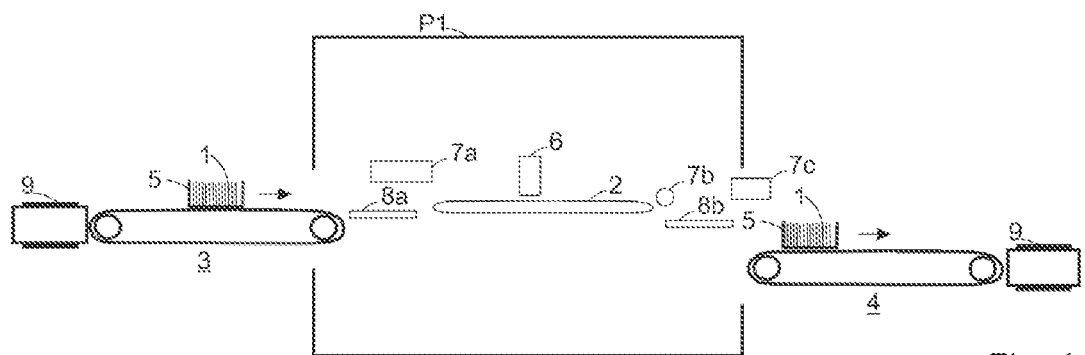

In FIG. 1d a checking apparatus P1 for value documents is outlined in a side view—in greatly simplified manner—, which apparatus is configured to check the individual value documents of the respective value-document stack. On the left in FIG. 1d there is located a transport apparatus 9, which is part of a cyclically circulating transport loop 10 (cf. FIG. 2a, b). The transport apparatus 9 transports the value-document containers 5 to a feed interface 3. Via a transport switch or by pushing over by means of a sliding element (not shown in FIG. 1d), the respective value-document container 5 is transported from the transport apparatus 9 into the feed interface 3, which has a conveyor belt in this example.

With the aid of the conveyor belt of the feed interface 3, the respective value-document container 5 is pushed onto a receiving plate 8a, on which the value-document container 5 is placed for removal of the value-documents. The checking apparatus has a removal device 7a, which removes value documents from the value-document container 5 and transfers them to a transport route 2. For example, the removal device 7a includes a singling device that singles the value documents directly from the value-document container 5 and feeds them to the transport route 2. The removal device 7a can also be configured to open the value-document container. Alternatively, the removal device 7a can also include a gripper that removes the value-document stack 1 from the value-document container 5 still located on the conveyor belt and puts it on the receiving plate 8a, and a singling device that picks the value documents individually from the value-document stack located on the receiving plate 8a and feeds them to the transport section 2.

In the checking apparatus P1, the value documents removed from the value-document container 5 are then transported individually one after the other along the transport route 2 past one or several sensors 6 that are configured to check the authenticity and possibly the condition of the value documents. Optionally, the value documents are sorted according to authenticity and/or condition into several output compartments of the checking apparatus P1. In front of the respective output compartment, the checking apparatus has e.g. a stacker wheel 7b, which stacks the value documents arriving individually from the transport route 2 onto a repository plate 8b. The checked value-document stack 1 put on the repository plate 8b is subsequently inserted into a transport container 5 by means of an output device, for example with the aid of a gripper 7c. However, other mechanisms for inserting the value documents into the value-document container 5 can also be used. For example, the value documents arriving from the transport route 2 can be stacked directly in the respective transport container 5—with the aid of a stacker wheel 7b or by falling freely. The value-document container 5 loaded with a value-document stack 1 is then transported away from the checking apparatus P1 via a discharge interface 4 and transferred to the transport apparatus 9 represented on the right in FIG. 1d, which transport apparatus can also be part of (the same or another) cyclically circulating transport loop, e.g. via a transport switch or by pushing over using a sliding element (not shown in FIG. 1d).

FIG. 2a shows a cyclically circulating transport loop 10, which forms a cyclically circulating feed loop for value-document stacks to two checking apparatuses P1 and P2, and feeds value-document stacks 1 (or value-document receptacles 5 with a value-document stack received therein) to the checking apparatuses P1, P2. Alternatively, only a single checking apparatus P1 can be connected to the cyclically circulating feed loop. The value-document stacks 1 to be checked (shown in black in FIG. 2a as well as in the further figures) are prepared—manually or automatically—at a preparation station E for the machine checking of the value documents and brought into stack form there. The preparation of the value documents includes e.g. also checking the value documents. During the manual preparation of the stacks, usually information about the value documents is recorded, e.g. specifications about the depositor, an account number, a transaction number or also the amount or the value of the value documents forming the deposit. The value-document stack 1 to be checked is inserted in a value-document receptacle 5 via a transport interface 14 of the preparation station E. The value-document receptacles 5 are transported clockwise by the transport apparatus 9 of the cyclically circulating transport loop 10, away from the transport interface 14 to the checking apparatuses P1, P2. A feed interface 3 is arranged between the respective checking apparatus and the cyclically circulating feed loop 10, which feed interface transports the respective value-document stack 1 alone (i.e. without its value-document receptacle 5)

or the respective value-document receptacle 5 with a value-document stack 1 received therein from the cyclically circulating feed loop 10 to the respective checking apparatus.

The cyclically circulating feed loop 10 allows changing the processing sequence of the value-document stacks 1 to be checked by the checking apparatus, e.g. if certain value-document stacks are to be checked with higher priority than other value-document stacks. The value-document stacks 1 to be checked with higher priority from the feed loop 10 are fed to the respective checking apparatus first, while the other value-document stacks 1 to be checked remain temporarily in the feed loop 10 and are fed to one of the checking apparatuses P1, P2 only during one of the next circulations around the feed loop. When, as here, two checking apparatuses P1, P2 are connected to the same feed loop 10, in addition each value-document stack 1 can be fed to the checking apparatus P1 or the other checking apparatus P2 for checking, e.g. in dependence on which one of the checking apparatuses P1, P2 currently has free processing capacities for this value-document stack 1 at the respective point in time.

The transport interface 14 of the preparation station E includes e.g. a gripper, which is arranged between the respective preparation station and the cyclically circulating transport loop and which inserts the value-document stack 1 to be checked into a value-document receptacle 5. The value-document receptacle 5 can be located on the transport apparatus 9 during insertion or can be removed from the transport apparatus 9 for the purpose of loading and then be returned onto the transport apparatus 9. As an alternative to a gripper, an inlet can also be arranged between the respective preparation station and the cyclically circulating transport loop, by which the preparation station is connected to the cyclically circulating feed loop 10, possibly via a transport switch. Value-document receptacles 5, which were loaded manually or automatically with value-document stacks in the preparation station E, can be fed continuously to the cyclically circulating transport loop 10 via the respective inlet.

Figure 2B:
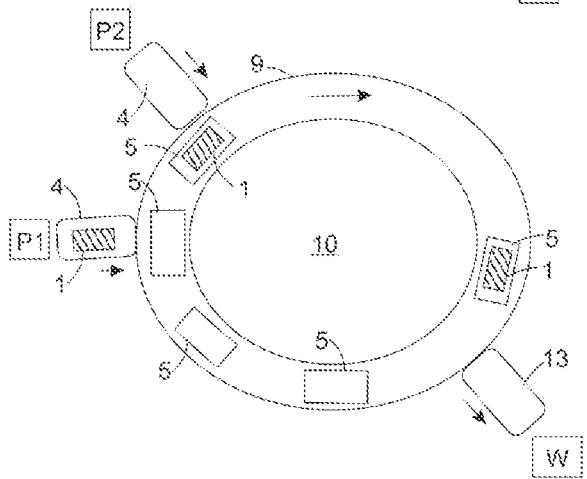

FIG. 2b shows a cyclically circulating transport loop that forms a cyclically circulating discharge loop for value-document stacks from two checking apparatuses P1 and P2, and discharges value-document stacks 1 (or value-document receptacles 5 with value-document stacks received therein) from the checking apparatuses P1, P2. Alternatively, only a single checking apparatus P1 can be connected to the cyclically circulating discharge loop. Between the respective checking apparatus and the cyclically circulating transport loop 10 there is arranged respectively a discharge interface 4, which transports the respective value-document stack 1 alone (without its value-document receptacle 5) or the respective value-document receptacle 5 with a value-document stack 1 received therein from the respective checking apparatus P1, P2 to the cyclically circulating discharge loop 10. The checked value-document stacks 1 are hatched in FIG. 2b as well as in the further figures. The value documents 5 are transported clockwise by the transport apparatus 9 of the cyclically circulating discharge loop 10, away from the respective checking apparatus P1, P2 to a transport interface 13 of the further processing apparatus W. The value-document stack 1 to be checked is removed from the value-document receptacle 5 at the transport interface 13. The transport interface 13 of the further processing apparatus W includes e.g. a gripper that removes the value-document stack 1 to be checked from the value-document receptacle 5, wherein the value-document receptacle 5 can be located on the transport apparatus 9 during the removal or can be removed from the transport apparatus 9 for the purpose of removal and is returned onto the transport apparatus 9 afterwards.

Alternatively, the transport interface 13 of the further processing apparatus can also include a branching via which the value-document receptacles 5 with the checked value-document stack 1 located therein can be transported continuously from the cyclically circulating discharge loop 10 to the further processing apparatus W. The further processing apparatus W is connected to the cyclically circulating discharge loop through the branching, possibly via a transport switch, in such a manner that value-document receptacles 5 can be fed continuously from the cyclically circulating discharge loop 10 via the branching to the respective further processing apparatus W.

The checked value-document stacks 1 are further processed at the further processing apparatus W. The further processing apparatus is configured e.g. for banding and/or for packaging the value-document stacks in foil. It is achieved through the cyclically circulating discharge loop 10 that each value-document stack 1 selectively can be fed to the further processing apparatus after its check or—e.g. if the further processing apparatus W currently cannot further process this value-document stack—can remain temporarily in the discharge loop 10 until the further processing apparatus W can further process this value-document stack 1. The cyclically circulating discharge loop 10 also allows changing the processing sequence of the checked value-document stack 1 by the further processing apparatus, e.g. prioritizing value-document stacks of a certain value document types, which are required for further processing, over other value-document stacks. The value-document stacks 1 from the discharge loop 10 to be further processed with higher priority are then fed to the further processing apparatus W first, while the other value-document stacks 1 temporarily remain in the discharge loop and are only fed to the further processing apparatus W during one of the next circulations around the discharge loop. When, as here, two checking apparatuses P1, P2 are connected to the same discharge loop 10, it is also achieved thereby that the value-document stacks 1 checked by the various checking apparatuses P1, P2 are joined again after they have been checked.

The two cyclically circulating transport loops 10 from FIGS. 2a and 2b can e.g. be formed by several lined-up conveyor belt sections or several lined-up roller conveyors, between which value-document receptacles 5 are respectively automatically transferred, e.g. by pushing over the value-document receptacles 5. However, also other and possibly different types of transport devices can also be employed for the respective cyclically circulating transport loop.

Figure 3:
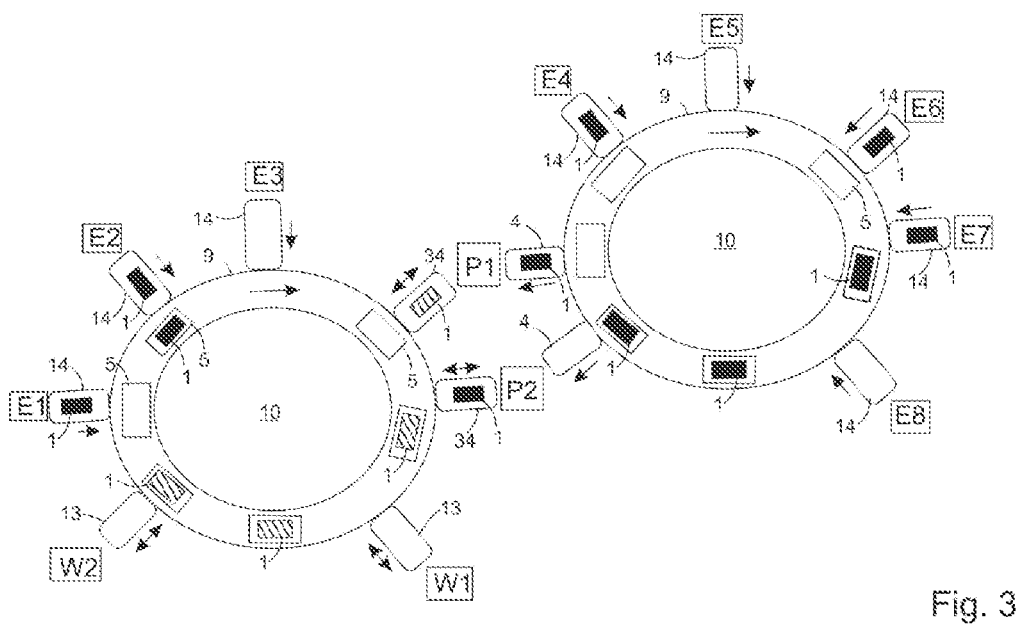
FIG. 3 an embodiment with an additional cyclically circulating transport loop with many preparation stations.

In FIG. 3, an embodiment with two cyclically circulating transport loops 10 is outlined, which deliver (e.g. unchecked) value-document stacks to the same two checking apparatuses P1, P2. The cyclically circulating transport loop 10 shown on the left in FIG. 3 is a combined, cyclically circulating feed and discharge loop, which serves for feeding (e.g. unchecked) value-document stacks 1 (black) to the checking apparatuses P1, P2, as well as for removing the value-document stacks 1 (hatched) checked by the checking apparatuses P1, P2. The checking apparatuses P1, P2 are each connected thereto via a combined feed and discharge interface 34. Three preparation stations E1-E3 are arranged on the combined feed and discharge loop, as well as two further processing apparatuses W1, W2. The cyclically circulating transport loop 10 shown on the right in FIG. 3 is a cyclically circulating feed loop on which five preparation stations E4-E8 are arranged. Since the number of preparation stations is selected in dependence on the number and speed of the checking apparatuses, more or fewer preparation stations and/or more than two checking apparatuses can also be employed in the manner shown in FIG. 3.

FIG. 4a shows an embodiment example of a combined feed and discharge interface 34 of a checking apparatus P1, which has both a branching 11 for the value-document receptacles from the cyclically circulating transport loop 10 and an inlet 15 for the value-document receptacles into the cyclically circulating transport loop 10. The branching 11 and the inlet 15 can be connected to the cyclically circulating transport loop 10 via a transport switch 12. The feed and discharge interface 34 of the checking apparatus P1 also has a bidirectional transport section 19, which is connected to both the branching 11 and the inlet 15 and via which the value-document receptacles can be transported selectively towards the checking apparatus P1 or away from the checking apparatus P1.

FIG. 4b shows an embodiment example of a discharge interface 4 for a checking apparatus P1, which is detached from the feed interface 3. The branching 11 and the inlet 15 of the checking apparatus P1 are each connected to the cyclically circulating transport loop 10 via their own transport switch 12, so that value-document receptacles 5 (with the value-document stack 1 received therein) selectively can either be fed via the branching 11 from the cyclically circulating transport loop 10 to an input interface of the checking apparatus P1 or can be transported past the checking apparatus P1. Value-document receptacles 5 are discharged from the output interface of the checking apparatus P1 to the cyclically circulating transport loop 10 via the inlet 15. For the value-document containers, a waiting position 17 can be present in front of the checking apparatus P1 in the branching 11, in which a value-document receptacle 5 can be stopped until the checking apparatus P1 can accept the value-document receptacle 5. Analogously, a waiting position 18 can be present behind the checking apparatus in the inlet 15, in which the value-document receptacle 5 can be stopped until the value-document receptacle 5 can be introduced into the cyclically circulating transport loop 10.

In the embodiment example of FIG. 4c, the branching 11 for the value-document receptacles from the cyclically circulating transport loop 10 and the inlet 15 for the value-document receptacles into the cyclically circulating transport loop 10 are at the same point in the cyclically circulating transport loop 10. Therefore, the branching and inlet of the value-document receptacles 5 can advantageously be controlled by the same transport switch. The discharge interface 4 and the feed interface 3 for the checking apparatus P1 are connected to one another in such a manner that the discharge interface 4 and the feed interface 3 form a further cyclically circulating transport loop for the value-document receptacles. This has the advantage of requiring little space for the branching and inlet and at the same time avoids having to reverse the transport direction of the value-document receptacles. The direction of circulation of this further cyclically circulating transport loop is reverse (here counterclockwise) to the direction of circulation of the cyclically circulating transport loop 10 (here clockwise). At the point of this further cyclically circulating transport loop that is closest to the checking apparatus P1, the value-document receptacles can stop and value documents can be removed and/or inserted, e.g. by a gripper 30 moved by means of a robot 31, which feeds unchecked value documents to the checking apparatus P1 or discharges checked value documents from the checking apparatus P1. Alternatively, the checking apparatus P1 can also be connected directly to the discharge interface 4 and to the feed interface 3, e.g. the feed interface 3 ends at an input interface of the checking apparatus P1 and the discharge interface 4 begins at an output interface of the checking apparatus P1.

In FIG. 5a-d a further embodiment example of a combined feed and discharge interface 34 is outlined, which in this case has a gripper 30, which is employed to grip the value-document stacks 1. The gripper 30 has two rake-like gripping elements between which a value-document stack 1 is clamped. It is moved two-dimensionally or three-dimensionally in space by a suitable kinematics 31, e.g. a robot, in order to remove respectively a value-document stack 1 from a value-document receptacle 5 located in the cyclically circulating transport loop 10 and insert it into an input compartment 33 of the checking apparatus P1 and vice versa, in order to remove respectively a checked value-document stack 1 from an output compartment 35 of the checking apparatus P1 and insert it in a value-document receptacle 5 located in the cyclically circulating transport loop 10.

FIG. 5a shows the situation at the point in time shortly before the gripper 30 removes a (e.g. unchecked) value-document stack 1 from the value-document receptacle 5, which is transported there by the transport apparatus 9 of the cyclically circulating transport loop 10. FIG. 5b shows the situation somewhat later, after the gripper 30 has removed the value-document stack 1 from the cyclically circulating transport loop 10, shortly before the gripper inserts the removed value-document stack 1 in the input compartment 33 of the checking apparatus P1. FIG. 5c shows the situation after a value-document stack 1 has been checked by the checking apparatus P1 at the point in time at which the gripper has just removed the checked value-document stack 1 from the output compartment 35 of the checking apparatus P1. FIG. 5d shows the situation shortly before the gripper 30 inserts the checked value-document stack 1 into a value-document receptacle 5, which is located in the cyclically circulating transport loop 10 at the time of insertion.

Figure 6:
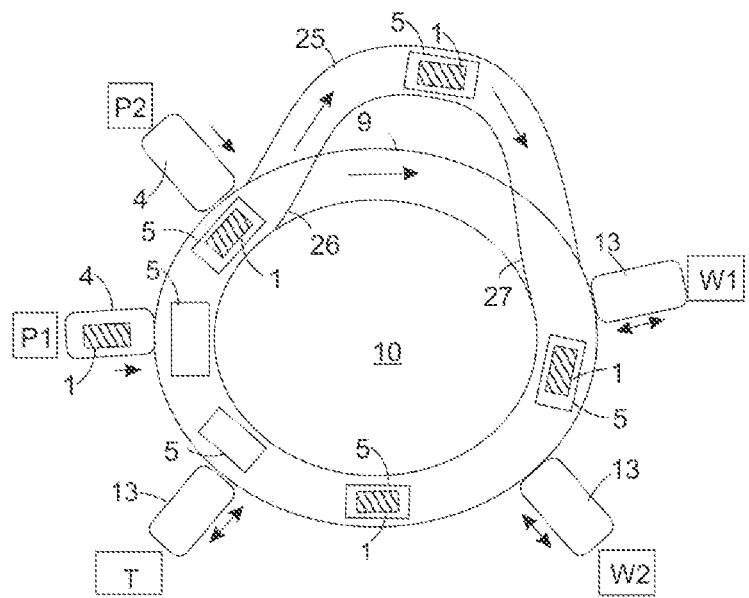
FIG. 6 embodiment example of a cyclically circulating transport loop with offload branch.

The embodiment example of FIG. 6 is based on that of FIG. 2b. The difference here, however, is that there are two further processing apparatuses W1, W2 connected to the cyclically circulating discharge loop 10 via a respective transport interface 13. For example, the further processing apparatuses are two packaging apparatuses W1, W2, which each pack a value-document stack 1 of a specific value-document type, namely a predetermined quantity of value-documents of a specific type. If at a certain point in time only a part of the specified quantity of the respective types of value document is available to one of the packaging devices W1, W2, the cyclically circulating discharge loop makes possible a selection of the correct value document type for the respective packaging device. The matching value document type can be selected by allowing the value-document stacks 1 of other value document types to pass by on the discharge loop 10 and such a value-document stack 1 that has the correct value document type (required by the packaging apparatus) is fed to the respective packaging apparatus first.

Further, in FIG. 6 a value document storage T, e.g. safe or the like, is present in the direction of circulation downstream of the further processing apparatuses W1, W2, said storage likewise being connected with the cyclically circulating discharge loop 10 via a transport interface 13. Checked, further processed value-document stacks 1 can be temporarily stored in it, but possibly also such checked value-document stacks 1 that come directly from one of the checking apparatuses P1, P2, but have not been further processed. Further, the cyclically circulating discharge loop 10 of FIG. 6 has an offload branch 25 with a branching 26 and an inlet 27, in which value-document receptacles 5, possibly with value-document stacks 1 received therein, can be separated temporarily from the cyclically circulating discharge loop 10 and can be reintroduced there later. This offload branch 25 allows intermediately parking certain value-document stacks 1, which are processed with low priority.

In FIG. 7a-e, further embodiment examples are represented in which the cyclically circulating transport loop 10 has at least two oppositely directed transport sections 40, 50 which are parallel to one another. In FIG. 7a-d these are respectively a combined feed and discharge loop 10, in FIG. 7e mutually detached feed and discharge loops 10, 10'. Two checking apparatuses P1, P2 are arranged inside the transport loop 10 in FIG. 7a. The preparation stations E1-E3 and the further processing apparatuses W1, W2 are arranged outside of the cyclically circulating transport loop 10.

Figure 7A:
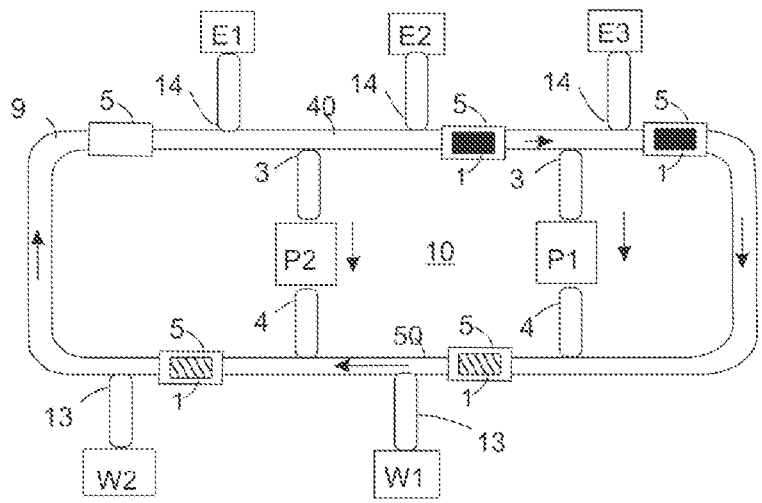
FIG. 7a-e embodiment examples of cyclically circulating transport loops with mutually parallel and oppositely directed transport sections.
Figure 7B:
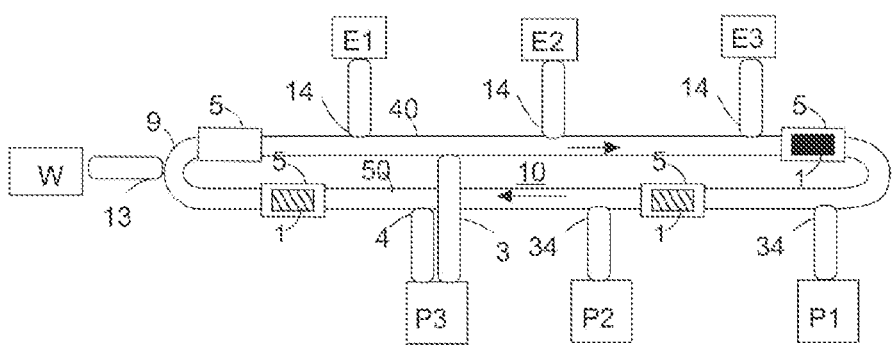

In the embodiment example of FIG. 7b, the two oppositely directed, mutually parallel transport sections 40, 50 have a lateral distance of only approximately 1 m from one another. This allows for one or several checking apparatuses to be equipped with a respective transport interface to both of the parallel transport sections. Here e.g. the checking apparatus P3 has a feed interface 3 from the upper one of the two parallel transport sections 40 and a discharge interface 4 to the lower one of the two parallel transport sections 50. This allows a rapid feeding of value-document stacks 1 coming from the preparation station E1. The processing sequence of the value-document stacks 1 can also be changed in this manner.

Figure 7C:
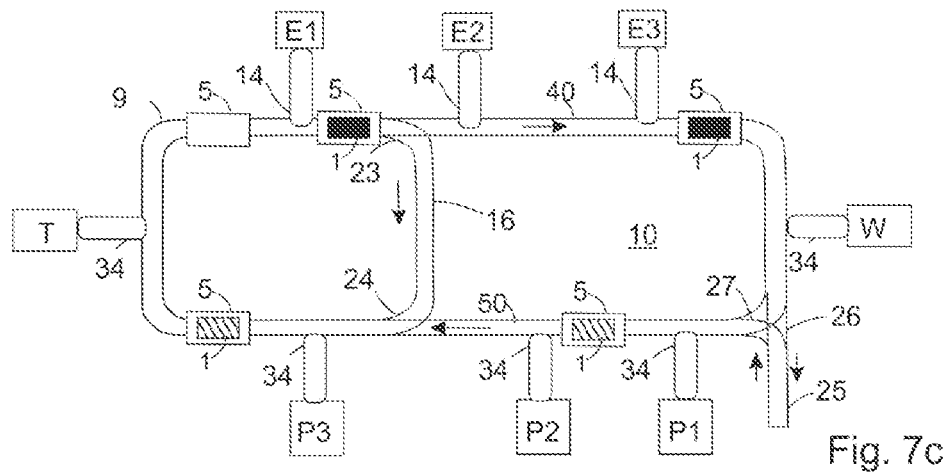

In the embodiment example of FIG. 7c the cyclically circulating transport loop 10 has a shortcut route 16, via which (e.g. unchecked) value-document stacks 1 of the preparation station E1 can be fed to the checking apparatus P3 faster than if these were transported from the preparation station E1 along the right part of the cyclically circulating transport loop 10 to the checking apparatus P3. The processing sequence of the value-document stacks 1 can also be changed in this manner. The shortcut route 16 is connected by a branching 23 and an inlet 24 to the cyclically circulating transport loop 10, which are possibly connected thereto via a transport switch. In addition, the cyclically circulating transport loop 10 has an offload branch 25 with a branching 26 and an inlet 27, in which value-document stacks 1 with their value-document receptacle 5 can be temporarily parked from the cyclically circulating discharge loop 10 and can be reintroduced there at a later time.

Figure 7D:
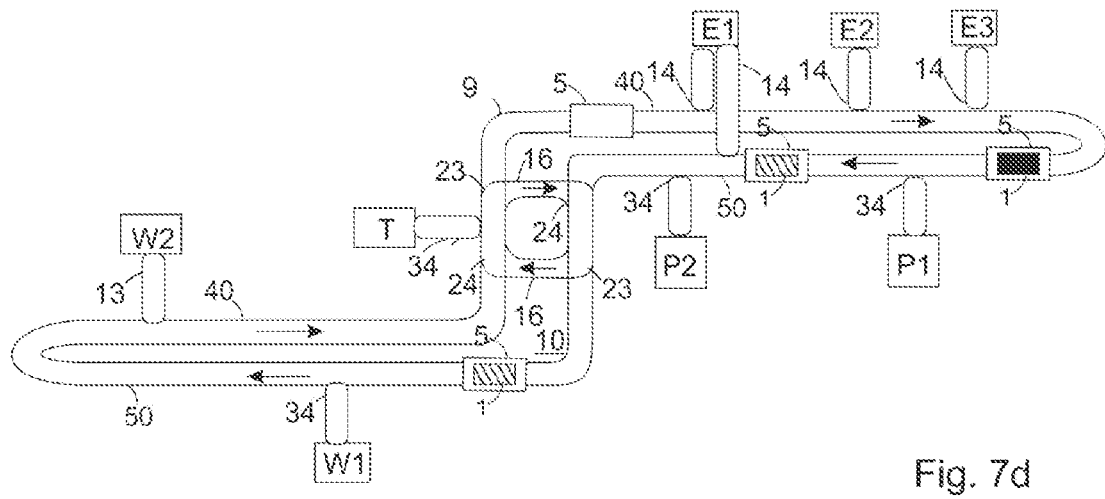

In the embodiment example of FIG. 7d, in the cyclically circulating transport loop 10 there is an upper and a lower pair of mutually parallel and oppositely directed transport sections 40, 50 with a lateral spacing of less than 2 m. On the upper pair 40, 50 there are located feed interfaces 14 to preparation stations E1-E3 and combined feed and discharge interfaces 34 to checking apparatuses P1, P2. On the lower pair 40, 50 there are located a discharge interface 13 and a combined feed and discharge interface 34 to further processing apparatuses W1, W2. Further, there are two shortcut routes 16 in the cyclically circulating transport loop 10 of FIG. 7d. The lower shortcut route 16 makes possible a faster feeding of checked value-document stacks 1 coming from the checking apparatuses P1, P2 to the value document storage T than along the cyclically circulating transport loop 10. The upper shortcut route 16 makes possible faster feeding of value-document stacks 1 (e.g. checked, intermediately stored in the value document storage T, but not yet further processed) from the value document storage T to the further processing apparatuses W1, W2 than along the cyclically circulating transport loop 10.

Figure 7E:
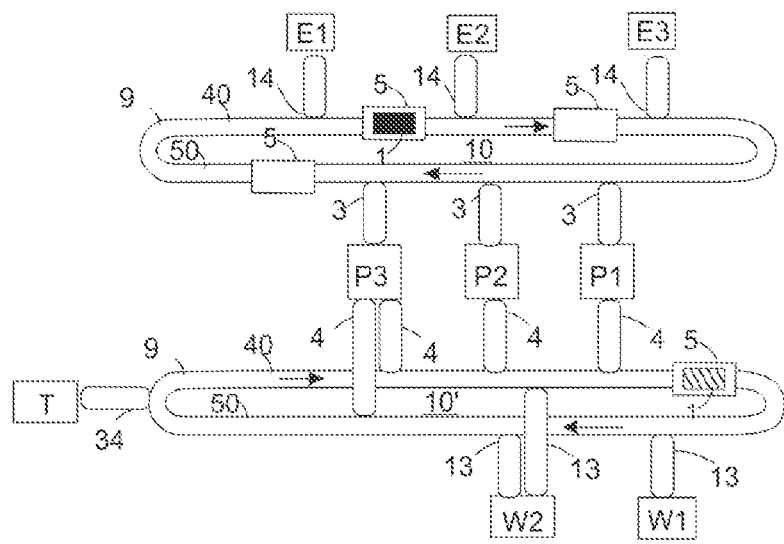

In the embodiment of FIG. 7e, the checking apparatuses P1-P3 are additionally connected to another cyclically circulating transport loop 10', in this case a cyclically circulating discharge loop 10' (bottom) detached from the cyclically circulating feed loop 10 (top). Both contain two mutually parallel, oppositely directed transport sections 40, 50. The checking apparatuses P1-P3 are located between the cyclically circulating feed loop 10 and the cyclically circulating discharge loop 10'. The checking apparatus P3 has an additional discharge interface 4 to the lower parallel transport section 50 of the cyclically circulating discharge loop 10', in order, in the event that many processed value-document stacks 1 come from the checking apparatuses P1-P3 in the cyclically circulating discharge loop 10, to send some processed value-document stacks 1—without further processing—directly to the value document storage T. To relieve the right part of the cyclically circulating discharge loop 10', the further processing apparatus W2 has an additional transport interface 13 to the upper transport section 40.

Figure 8:
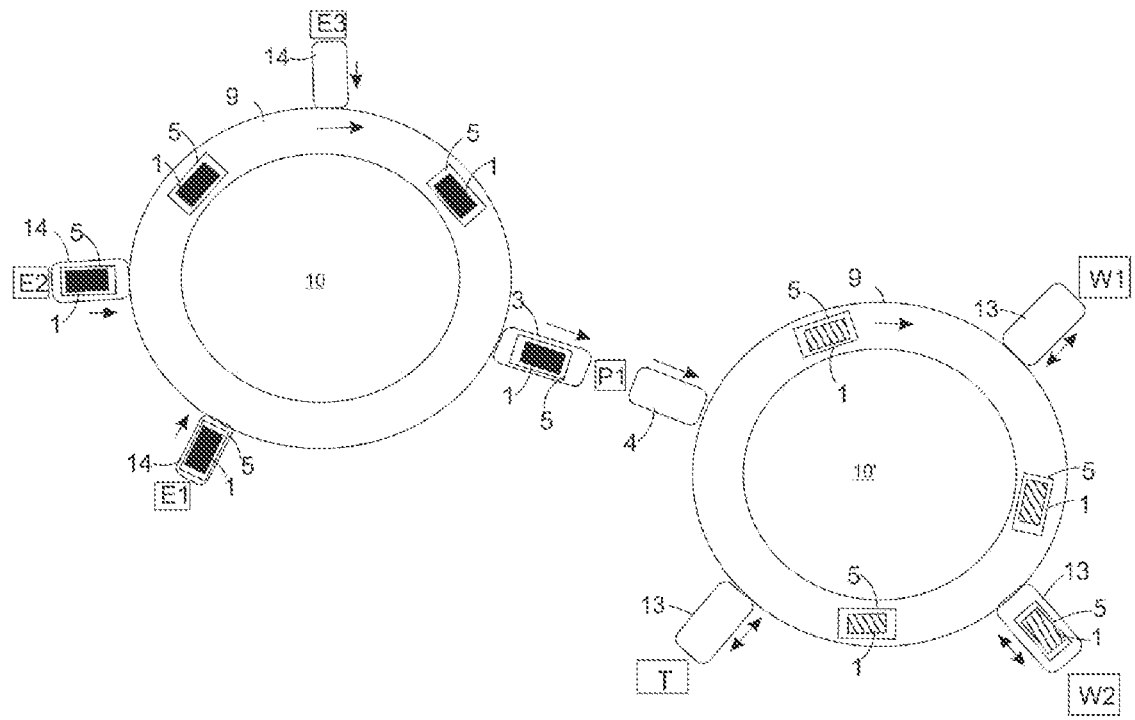
FIG. 8 an embodiment example of a cyclically circulating feed loop and a cyclically circulating discharge loop which are connected to the same checking apparatus.

In the embodiment example of FIG. 8, the cyclically circulating feed loop 10 and the cyclically circulating discharge loop 10' are also detached from one another. In this embodiment example, only a single checking apparatus P1 is employed. The feeding of (e.g. unchecked) value-document stacks 1 to the checking apparatus P1 takes place from the cyclically circulating feed loop 10, the output of checked value-document stacks 1 into the cyclically circulating discharge loop 10'. The feeding of (e.g. unchecked) value-document stacks 1 from the cyclically circulating feed loop 10 to the checking apparatus P1 and the discharge of the checked value-document stacks 1 from the checking apparatus P1 to the cyclically circulating discharge loop 10' take place in this example together with the respective value-document receptacle 5 (e.g. as explained with respect to FIG. 4a-c). The same also applies to the feeding from the preparation stations E1-E3 and the discharge to the further processing apparatuses W1, W2. The checking apparatus P1 can employ the emptied value-document receptacle 5, which comes from the cyclically circulating feed loop 10, for loading with value-document stacks checked by the checking apparatus and send the reloaded value-document receptacle 5 to the cyclically circulating discharge loop 10'. With reference to the embodiment example from FIG. 8, it is also conceivable for the checked value-document stacks 1 to be received from the checking apparatus P1 by other value-document receptacles 5, possibly, and brought via the respective discharge interface 4 to the cyclically circulating discharge loop 10'. The feeding and/or discharge of the value-document stacks 1 to the/from the checking device P1 can also take place without the respective value-document receptacle 5 (e.g. by a gripper as explained with respect to FIG. 5).

Figure 9:
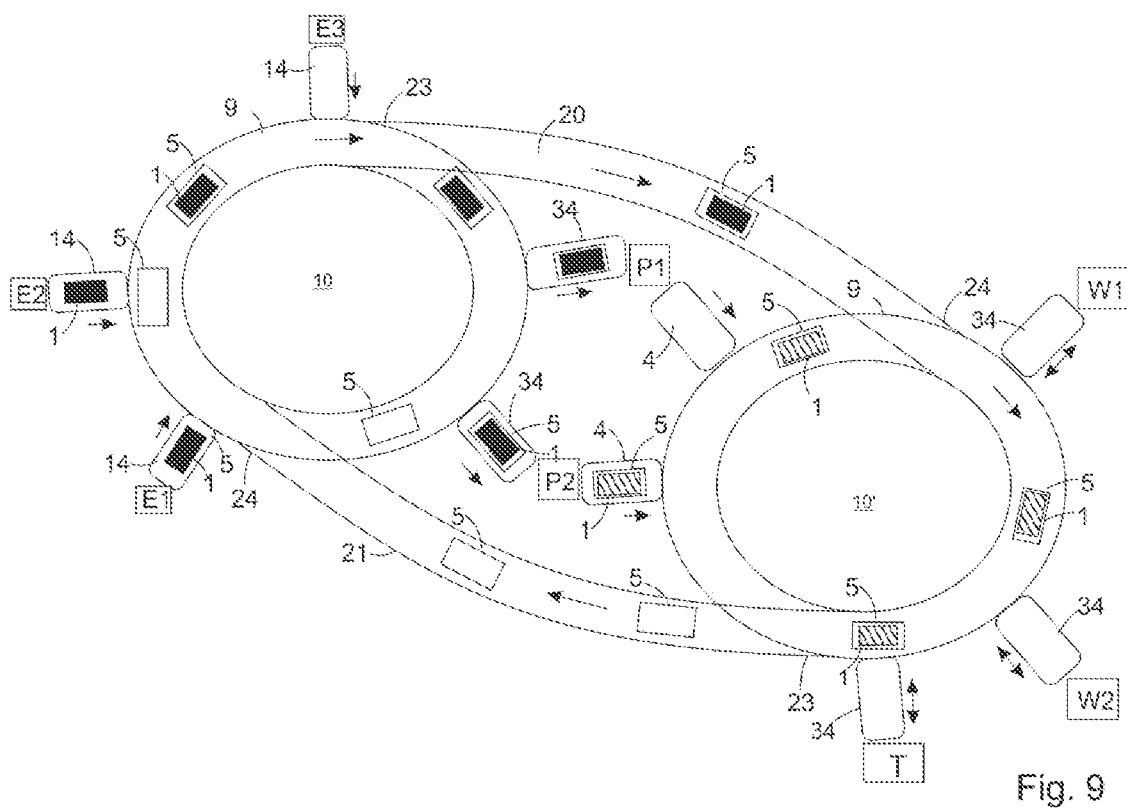
FIG. 9 embodiment examples of bypass transport routes between two cyclically circulating transport loops.

In the embodiment example of FIG. 9, after the removal of the respective value-document stack 1, the respective checking apparatus P1, P2 returns value-document receptacles 5 via a transport interface 34 (cf. FIG. 4a) to the cyclically circulating feed loop 10 so that they can be loaded again at the preparation stations E1-E3. In addition, in this embodiment example, there are two bypass transport paths 20, 21, by which the cyclically circulating feed loop 10 is connected to the cyclically circulating discharge loop 10'. Value-document receptacles 5 with (e.g. unchecked) value-document stacks 1 received therein can reach the cyclically circulating discharge loop 10' bypassing the checking apparatuses P1, P2, i.e. without the value documents in question being subjected to a check by the checking apparatuses P1, P2. Via the lower bypass transport route 21, empty value-document receptacles 5 (without a value-document stack received therein) can return from the cyclically circulating discharge loop 10', bypassing the checking apparatuses P1, P2, to the cyclically circulating feed loop 10 so that these can be loaded again (at the preparation stations).

The invention claimed is:

1. An assembly for processing value documents, having
a transport apparatus for value-document receptacles, which is configured to transport several value-document receptacles, by which respectively at least one value-document stack can be received, along a direction of circulation,
at least one, in particular two or more, checking apparatuses for checking value documents, which are connected to the transport apparatus,
wherein the assembly has at least one transport interface for each of the checking apparatuses, by which the respective checking apparatus is connected to the transport apparatus in such a manner that value-document stacks, possibly together with a value-document receptacle receiving the respective at least one value-document stack, can be transported via the respective transport interface from the transport apparatus to the respective checking apparatus and/or from the respective checking apparatus to the transport apparatus, wherein
the transport apparatus forms a cyclically circulating transport loop for the value-document receptacles, and
the respective checking apparatus is connected to the cyclically circulating transport loop by the respective transport interface in such a manner that the respective value-document stack, possibly together with the respective value-document receptacle receiving at least one value-document stack, can be transported via the respective transport interface from the cyclically circulating transport loop to the respective checking apparatus and/or from the respective checking apparatus to the cyclically circulating transport loop,
wherein for at least one of the checking apparatuses the transport interface has a gripper which is configured:
to remove respectively one value-document stack from the cyclically circulating transport loop and to feed the respective value-document stack to the respective checking apparatus, and/or
to take over respectively one value-document stack from the respective checking apparatuses and to feed it to the cyclically circulating transport loop.

2. The assembly according to claim 1, wherein the assembly, along the cyclically circulating transport loop, has a first transport interface to an alternative route for the value-document receptacles and—along the direction of circulation of the cyclically circulating transport loop viewed after the first transport interface—has a second transport interface for the value-document receptacles to the alternative route,
wherein the alternative route is in particular a shortcut route, which is shorter than the route between the first transport interface and the second transport interface, which leads along the cyclically circulating transport loop.

3. The assembly according to claim 1, wherein the assembly, along the cyclically circulating transport loop, has at least one transport interface to an offload branch, into which value documents receptacles, possibly with at least one value-document stack received therein, can be temporarily separated from the cyclically circulating transport loop and from which they can be reintroduced into the cyclically circulating transport loop at a later point in time.

4. The assembly according to claim 1, wherein for at least one of the checking apparatuses the assembly has a feed interface or a combined feed and discharge interface as the respective transport interface, which is configured to feed a value-document stack, possibly together with a value-document receptacle receiving the respective at least one value-document stack, from the cyclically circulating transport loop to the respective checking apparatus.

5. The assembly according to claim 4, wherein the assembly, along the cyclically circulating transport loop, has at least one transport interface to a preparation station, by which the respective preparation station is connected to the cyclically circulating transport loop,
wherein the transport interface of the respective preparation station is adapted to feed value-document stacks prepared at the preparation station, possibly together with a value-document receptacle receiving the respective at least one value-document stack, to the cyclically circulating transport loop.

6. The assembly according to claim 1, wherein for at least one of the checking apparatuses the assembly has a discharge interface or a combined feed and discharge interface as the respective transport interface, which is configured to discharge a value-document stack, possibly together with a value-document receptacle receiving the respective at least one value-document stack, from the respective checking apparatus to the cyclically circulating transport loop.

7. The assembly according to claim 6, wherein the assembly along the cyclically circulating transport loop has at least one transport interface to a further processing apparatus, by which the respective further processing apparatus is connected to the cyclically circulating transport loop,
wherein the transport interface of the respective further processing apparatus is adapted to discharge value-document stacks checked by one of the checking apparatuses, possibly together with a value-document receptacle receiving the respective at least one value-document stack, from the cyclically circulating transport loop in order to be able to transport the value-document stacks to the respective further processing apparatus.

8. The assembly according to claim 1, wherein for at least one of the checking apparatuses the assembly has respectively
a feed interface via which the value-document stacks, possibly together with a respective value-document receptacle receiving the respective at least one value-document stack, can be fed from the cyclically circulating transport loop to the respective checking apparatus,
as well as a discharge interface, via which the value-document stacks checked by the respective checking apparatus, possibly together with a value-document receptacle receiving the respective at least one value-document stack, can be discharged from the respective checking apparatus to another cyclically circulating transport loop.

9. The assembly according to claim 8, wherein the at least one checking apparatus is connected between the cyclically circulating transport loop and the other cyclically circulating transport loop in such a manner that value documents can be transported from the cyclically circulating transport loop, through the feed interface to the respective checking apparatus and from this checking apparatus via the discharge interface to the other cyclically circulating transport loop.

10. The assembly according to claim 1, wherein for at least one of the checking apparatuses the assembly has respectively
a feed interface, via which value-document stacks, possibly together with a value-document receptacle receiving the respective at least one value-document stack, can be fed from the cyclically circulating transport loop to the respective checking apparatus,
as well as a discharge interface, via which value-document stacks checked by the respective checking apparatus, possibly together with a value-document receptacle receiving the respective at least one value-document stack, can be discharged to the same cyclically circulating transport loop from which they were fed to the respective checking apparatus.

11. The assembly according to claim 1, wherein the gripper is configured to
remove the respectively one value-document stack, together with a value-document receptacle receiving the respective at least one value-document stack, from the cyclically circulating transport loop and to feed the respective value-document stack to the respective checking apparatus, and/or
take over the respectively one value-document stack, together with a value-document receptacle receiving the respective at least one value-document stack, from the respective checking apparatuses and to feed it to the cyclically circulating transport loop.

12. The assembly according to claim 11, wherein the gripper is adapted to remove respectively one value-document stack from one of the value-document receptacles located in the cyclically circulating transport loop,
wherein the removal of the value-document stack by the gripper e.g. is carried out while the value-document receptacle receiving the value-document stack is transported in the cyclically circulating transport loop.

13. The assembly according to claim 1, wherein, for at least one of the checking apparatuses, the assembly has respectively one combined feed and discharge interface, which is adapted to transport value-document stacks, possibly together with a respective value-document receptacle receiving the at least one value-document stack, both from the cyclically circulating transport loop to the respective checking apparatus and from the respective checking apparatus to the cyclically circulating transport loop.

14. The assembly according to claim 1, wherein in at least one of the checking apparatuses the respective transport interface of the respective checking apparatus is adapted to transport a value-document receptacle together with at least one value-document stack received thereby, continuously from the cyclically circulating transport loop via the transport interface to the respective checking apparatus and/or continuously from the respective checking apparatus via the transport interface to the cyclically circulating transport loop.

15. The assembly according to claim 13, wherein the feed interface of the respective checking apparatus or the combined feed and discharge interface of the respective checking apparatus a has a branching which is connected via a transport switch to the transport apparatus of the cyclically circulating transport loop in such a manner that one or several value-document receptacles, each with at least respectively one value-document stack received therein, can be transported via the transport switch selectively either continuously from the cyclically circulating transport loop into the respective branching or continuously further along the cyclically circulating transport loop.

16. The assembly according to claim 13, wherein in at least one of the checking apparatuses the discharge interface or the combined feed and discharge interface of the checking apparatus has an inlet which is connected to the transport apparatus of the cyclically circulating transport loop in such a manner that one or several value-document receptacles with respectively at least one value-document stack received therein can be transported from the checking apparatus continuously via the inlet into the cyclically circulating transport loop.

17. The assembly according to claim 1, wherein the transport apparatus along the cyclically circulating transport loop has at least one transport interface, in particular a branching, to a bypass transport route for the value-document receptacles, which leads away from the cyclically circulating transport loop to a further processing apparatus and/or to another cyclically circulating transport loop,
wherein in particular
value-document stacks, together with the value-document receptacle receiving the respective value-document stack, can be transported from the cyclically circulating transport loop via the bypass transport route to a further processing apparatus and/or or to the other cyclically circulating transport loop without the respective value-document stack being checked by one of the checking apparatuses, or
value-document receptacles without a value-document stack received therein can be transported from the other cyclically circulating transport loop via the bypass transport route to the cyclically circulating transport loop.

18. A method for processing value documents with the aid of at least one, in particular with the aid of two or more, checking apparatuses for checking value documents and with the aid of a transport apparatus to which the respective checking apparatus is connected via respectively at least one transport interface,
wherein in the method
the transport apparatus transports several value-document receptacles, in which respectively at least one value-document stack is received, along a direction of circulation, and
the respective transport interface transports the value-document stacks, possibly together with a value-document receptacle receiving the respective at least one value-document stack, from the transport apparatus to the respective checking apparatus and/or from the respective checking apparatus to the transport apparatus,
wherein
the transport apparatus forms a cyclically circulating transport loop for the value-document receptacles and the respective checking apparatus is connected to the cyclically circulating transport loop by the respective transport interface, and
the respective transport interface transports the respective value-document stack, possibly together with a value-document receptacle receiving the respective at least one value-document stack, from the cyclically circulating transport loop to the respective checking apparatus and/or from the respective checking apparatus to the cyclically circulating transport loop, and wherein for at least one of the checking apparatuses the transport interface has a gripper which:
removes respectively one value-document stack from the cyclically circulating transport loop and feeds the respective value-document stack to the respective checking apparatus, and/or
takes over respectively one value-document stack from the respective checking apparatuses and feeds it to the cyclically circulating transport loop.

19. An assembly for processing value documents, having
a transport apparatus for value-document receptacles, which is configured to transport several value-document receptacles, by which respectively at least one value-document stack can be received, along a direction of circulation,
at least two checking apparatuses for checking value documents, which are connected to the transport apparatus,
wherein the assembly has at least one transport interface for each of the checking apparatuses, by which the respective checking apparatus is connected to the transport apparatus in such a manner that value-document stacks, possibly together with a value-document receptacle receiving the respective at least one value-document stack, can be transported via the respective transport interface from the transport apparatus to the respective checking apparatus and/or from the respective checking apparatus to the transport apparatus, wherein
the transport apparatus forms a cyclically circulating transport loop for the value-document receptacles, and the respective checking apparatus is connected to the cyclically circulating transport loop by the respective transport interface in such a manner that the respective value-document stack, possibly together with the respective value-document receptacle receiving at least one value-document stack, can be transported via the respective transport interface from the cyclically circulating transport loop to the respective checking apparatus and/or from the respective checking apparatus to the cyclically circulating transport loop,
wherein the assembly has a control device which is adapted to cause value-document stacks transported in the transport apparatus to be fed selectively to one or the other of the at least two checking apparatuses,
wherein the cyclically circulating transport loop allows the value-document stack to be exchanged between the cyclically circulating transport loop and the respective checking apparatus, as required, at a variable point in time and/or allows the value-document stack to be exchanged between the respective checking apparatus and the cyclically circulating transport loop, as required, at a variable point in time.

20. The assembly according to claim 19, wherein the control device is adapted to cause value-document stacks transported in the transport apparatus to be fed selectively to one or the other of the at least two checking apparatuses in dependence on a utilization of at least one of the at least two checking apparatuses.

* * * * *

UNITED STATES PATENT AND TRADEMARK OFFICE
CERTIFICATE OF CORRECTION

| | |
|---|---|
| PATENT NO. | : 12,094,284 B2 |
| APPLICATION NO. | : 17/776475 |
| DATED | : September 17, 2024 |
| INVENTOR(S) | : Andreas Jakobs et al. |

It is certified that error appears in the above-identified patent and that said Letters Patent is hereby corrected as shown below:

On the Title Page

The assignee (73) Change:
"(73) Assignee: GIESECKE-DEVRIENT CURRENCY TECHNOLOGY GMBH"
To:
--(73) Assignee: GIESECKE+DEVRIENT CURRENCY TECHNOLOGY GMBH--

Signed and Sealed this
Twenty-second Day of October, 2024

Katherine Kelly Vidal
*Director of the United States Patent and Trademark Office*